United States Patent
Hase et al.

(10) Patent No.: US 7,937,571 B2
(45) Date of Patent: May 3, 2011

(54) INFORMATION-PROCESSING APPARATUS AND ACTIVATION METHOD AND PROGRAM FOR ACTIVATING AN OPERATING SYSTEM IN A SHORT PERIOD OF TIME

(75) Inventors: Tatsuo Hase, Nagano (JP); Kenichi Hashimoto, Nagano (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 11/753,100

(22) Filed: May 24, 2007

(65) Prior Publication Data

US 2008/0005541 A1 Jan. 3, 2008

(30) Foreign Application Priority Data

Jun. 12, 2006 (JP) .................. 2006-161853

(51) Int. Cl.
*G06F 7/38* (2006.01)
*G06F 9/00* (2006.01)
*G06F 9/44* (2006.01)
*G06F 13/00* (2006.01)
*G06F 13/28* (2006.01)
*G06F 15/177* (2006.01)

(52) U.S. Cl. ............................ 712/228; 711/117; 713/2

(58) Field of Classification Search .................. 712/228; 711/117; 713/2
See application file for complete search history.

(56) References Cited

U.S. PATENT DOCUMENTS

| | | | | |
|---|---|---|---|---|
| 5,606,685 A * | 2/1997 | Frandeen | ...................... | 711/117 |
| 5,666,540 A * | 9/1997 | Hagiwara et al. | ............. | 713/323 |
| 2005/0149646 A1* | 7/2005 | Kadatch et al. | ................. | 710/24 |

FOREIGN PATENT DOCUMENTS

| | | |
|---|---|---|
| JP | 2004-038546 | 2/2004 |
| JP | 2004-362426 | 12/2004 |
| JP | 2005-149225 | 6/2005 |
| JP | 2005-316809 A | 11/2005 |
| JP | 2006-48422 A | 2/2006 |
| JP | 2006-85209 A | 3/2006 |

OTHER PUBLICATIONS

U.S. Appl. No. 11/675,796, filed Feb. 16, 2007, Kobayashi, et al.

* cited by examiner

*Primary Examiner* — Eddie P Chan
*Assistant Examiner* — William B Partridge
(74) *Attorney, Agent, or Firm* — Oblon, Spivak, McClelland, Maier & Neustadt, L.L.P.

(57) ABSTRACT

An information-processing apparatus including an execution-state holding unit that stores an execution state of a program executed by a computer, an execution-state saving unit configured to store the execution state in effect upon execution of the program at a predetermined execution point of the program, a transfer-history holding unit that stores a transfer history, the transfer history based on how the execution state stored in the execution-state saving unit has been transferred to the execution-state holding unit, an access detection unit configured to detect whether the computer has accessed the execution state stored in the execution-state holding unit, and a necessary area transfer unit configured to transfer, based on the transfer history, an area of the execution state accessed by the computer from the execution-state saving unit to the execution-state holding unit when the accessed area has not been transferred from the execution-state saving unit to the execution-state holding unit.

9 Claims, 18 Drawing Sheets

FIG.6

| VIRTUAL ADDRESS | PHYSICAL ADDRESS | PAGE VALID FLAG | PAGE PROTECTION FLAG |
|---|---|---|---|
| x00000000 | x09876540 | 1 | 1 |
| x00000001 | x09876541 | 0 | 1 |
| x00000002 | x09876542 | 1 | 1 |
| x00000003 | x09876543 | 0 | 1 |
| ⋮ | ⋮ | ⋮ | ⋮ |
| xFFFFFFFF | xABCD1234 | 1 | 0 |

INFORMATION-PROCESSING APPARATUS AND ACTIVATION METHOD AND PROGRAM FOR ACTIVATING AN OPERATING SYSTEM IN A SHORT PERIOD OF TIME

CROSS REFERENCES TO RELATED APPLICATIONS

The present invention contains subject matter related to Japanese Patent Application JP 2006-161853 filed with the Japan Patent Office on Jun. 12, 2006, the entire contents of which being incorporated herein by reference.

BACKGROUND OF THE INVENTION

1. Field of the Invention

The present invention relates to an information-processing apparatus. More particularly, the present invention relates to an information-processing apparatus that can be activated in a short period of time, an activation method adopted by the information-processing apparatus, and a program to be executed by a computer of the information-processing apparatus to implement the activation method.

2. Description of the Related Art

An operating system of a computer is a basic program that treats hardware of the computer as an abstract entity and provides an operating environment to application programs running on the hardware. When the power-supply switch of an information-processing apparatus is turned on, a boot loader loads the kernel of the operating system into the hardware in order to activate the operating system. The functions of recent operating systems are enhanced, prolonging the time it takes to activate the operating system. A typical length of the time it takes to activate the operating system is about several tens of seconds.

In order to activate the operating system in a short period of time, a variety of techniques have been tried so far. In accordance with a typical disclosed technique, immediately after a power-supply plug is inserted into a power-supply outlet, the kernel of the operating system is loaded into a memory in order to carry out an expansion process in advance. Then, when the power-supply switch is turned on, the kernel of the operating system is executed on the memory in a short period of time (e.g., see Japanese Patent Laid-Open No. 2005-149225 (FIG. 1)).

SUMMARY OF THE INVENTION

In the typical technology described above, the time it takes to load an operating system can be shortened. However, to start executing the operating system requires that loading of the OS be completed.

Another commonly adopted technique is called hibernation whereby a memory image of the operating system running on the information-processing apparatus is saved into a nonvolatile memory so that the image may be transferred to an internal memory of the apparatus upon activation. However, it also takes a certain period of time to transfer the memory image (hibernation image) from one memory to another.

Meanwhile, in an initial sate immediately after activation of the operating system, only parts of the memory area are used by the operating system. That means it is not necessary to load the entire kernel in advance.

The present invention has been made in view of the above circumstances and provides arrangements whereby, with the hibernation scheme in place, execution of the operating system is started before the transfer of all hibernation image is completed.

In solving the foregoing and other problems of the related art and according to one embodiment of the present invention, there is provided an information-processing apparatus including: a computer; an execution-state holding unit configured to hold an execution state of a program executed by the computer; an execution-state saving unit configured to save a particular execution state in effect upon execution of the program at a predetermined execution point; a transfer-history holding unit configured to hold a history of how the particular execution state saved in the execution-state saving unit has been transferred to the execution-state holding unit; an access detection unit configured to detect whether the computer has accessed the execution state held in the execution-state holding unit; and a necessary area transfer unit configured to transfer a particular area of the execution state accessed by the computer from the execution-state saving unit to the execution-state holding unit if, by referencing the transfer history upon detection of the access, the accessed particular area is found yet to be transferred from the execution-state saving unit to the execution-state holding unit. Thus when an area yet to be transferred to the execution-state holding unit is accessed, the inventive apparatus causes that area to be transferred from the execution-state saving unit to the execution-state holding unit. This makes it possible to start executing the computer before all areas have been transferred from the execution-state saving unit to the execution-state holding unit.

Preferably, the execution state held in the execution-state holding unit may include a memory image managed by an operating system. The execution-state saving unit may preferably include a nonvolatile memory. The particular area may preferably be a page representing one of segments making up the area held by the execution-state holding unit, the segments having a fixed size each.

Preferably, the information-processing apparatus according to an embodiment of the present invention may further include an advance transfer unit configured to transfer to the execution-state holding unit a part of the particular execution state saved in the execution-state saving unit, upon activation of the information-processing apparatus. This structure enables part of the saved execution state to be transferred from the execution-state saving unit to the execution-state holding unit before actual access takes place, whereby the transfer rate in effect upon access can be improved.

Preferably, the information-processing apparatus may further include a delayed transfer unit configured to transfer to the execution-state holding unit those parts of the particular execution state in the execution-state saving unit which were not transferred earlier by the advance transfer unit. This structure allows the non-transferred parts of the saved execution state to be transferred from the execution-state saving unit to the execution-state holding state following advance transfer but prior to access, whereby the transfer rate in effect upon access can be enhanced.

Preferably, the information-processing apparatus may further include: a second access detection unit configured to detect whether the computer has accessed the execution state held in the execution-state holding unit prior to the execution of the program at the predetermined execution point; and an advance transfer object holding unit configured to hold a history of how the second access detection unit has detected the access of the computer, as an object to be transferred by the advance transfer unit. This structure permits execution of advance transfer based on the actual access history.

According to another embodiment of the present invention, there is provided a method for activating an information-processing apparatus including a computer, an execution-state holding unit configured to hold an execution state of a program executed by the computer, an execution-state saving unit configured to save a particular execution state in effect upon execution of the program at a predetermined execution point, and a transfer-history holding unit configured to hold a history of how the particular execution state saved in the execution-state saving unit has been transferred to the execution-state holding unit; as well as a program for causing the computer of the same information-processing apparatus to execute a procedure, the method and the procedure each including the steps of: detecting whether the computer has accessed the execution state held in the execution-state holding unit; and transferring a particular area of the execution state accessed by the computer from the execution-state saving unit to the execution-state holding unit if, by referencing the transfer history upon detection of the access, the accessed particular area is found yet to be transferred from the execution-state saving unit to the execution-state holding unit. Thus when an area yet to be transferred to the execution-state holding unit is accessed, the method as well as the program of the present embodiments of the invention causes that area to be transferred from the execution-state saving unit to the execution-state holding unit.

According to the present embodiments of the invention, as outlined above, the execution of the operating system can be started before the transfer of all portions of its hibernation image is completed.

BRIEF DESCRIPTION OF THE DRAWINGS

Further objects and advantages of the present invention will become apparent upon a reading of the following description and appended drawings in which:

FIG. 6 is a schematic view showing a typical MMU table according to an embodiment the present invention;

DETAILED DESCRIPTION OF THE PREFERRED EMBODIMENTS

Figure 1:
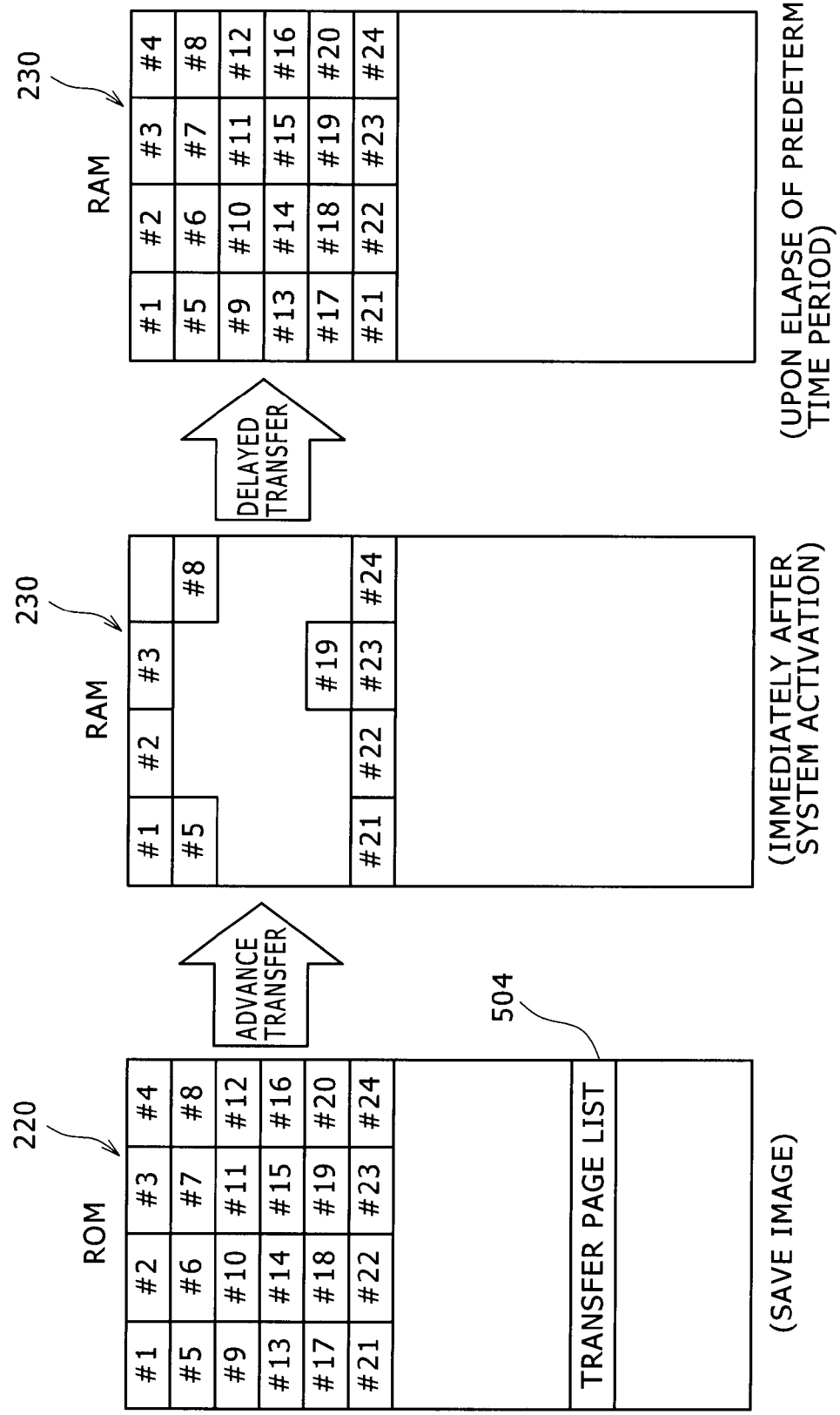
FIG. 1 is a schematic view outlining how page transfer typically takes place in a manner according to an embodiment of the present invention.

Preferred embodiments of the present invention will now be described in reference to the accompanying drawings. FIG. 1 schematically outlines how page transfer typically takes place in a manner according to the present invention. When embodied, the embodiment of the present invention presupposes that an execution state of a program executed by a computer of an information-processing apparatus is saved beforehand in a ROM (Read Only Memory) 220 of the apparatus. The execution state in this context refers illustratively to the contents of each register in the information-processing apparatus or a memory image managed by an operating system of the apparatus. The registers of the information-processing apparatus illustratively include registers of a CPU (Central Processing Unit) and registers of peripheral circuits. A program point at which the execution state is to be held (e.g., on a program counter) is set appropriately by an analyzing apparatus to be discussed later.

The execution state held in the ROM 220 is shown constituted by 24 areas numbered 1 through 24. The areas may be implemented illustratively by memory pages of a fixed size each. The ROM 220 is typically formed by a nonvolatile memory such as a flash memory. After the information-processing apparatus is switched off, the nonvolatile memory keeps its stored execution state intact.

When the information-processing apparatus is turned on and its operating system is activated (i.e., start-up of the information-processing apparatus), the execution state in the ROM 220 is transferred from there to a RAM (Random Access Memory) 230. The RAM 230 is typically formed by a volatile memory such as SDRAM (Synchronous Dynamic Random Access Memory). The scheme involving the transfer of an execution state from the ROM 220 to the RAM 230 is called hibernation, and the execution state saved in the ROM 220 is called the hibernation image.

With this embodiment, part of the hibernation image is transferred immediately after activation of the information-processing apparatus, and the operating system starts getting executed before the transfer of the entire hibernation image is completed. In this context, the partial transfer immediately after power-on is called "advance transfer." The pages to be transferred in advance are indicated in a transfer page list 504 in the ROM 220. The transfer page list 504 is created by an analyzing apparatus (FIG. 2), and advance transfer is effected by an executing apparatus (FIG. 11) on the basis of the transfer page list 504.

Following the advance transfer, the operating system starts getting executed. The pages not transferred in advance are transferred in parallel with execution of the operating system from the ROM 220 to the RAM 230. With this embodiment, the page transfer performed during operating system execution is called "delayed transfer." The delayed transfer involves transferring the entire execution state to the RAM 230 upon elapse of a predetermined time period from the start of operating system execution.

Figure 2:
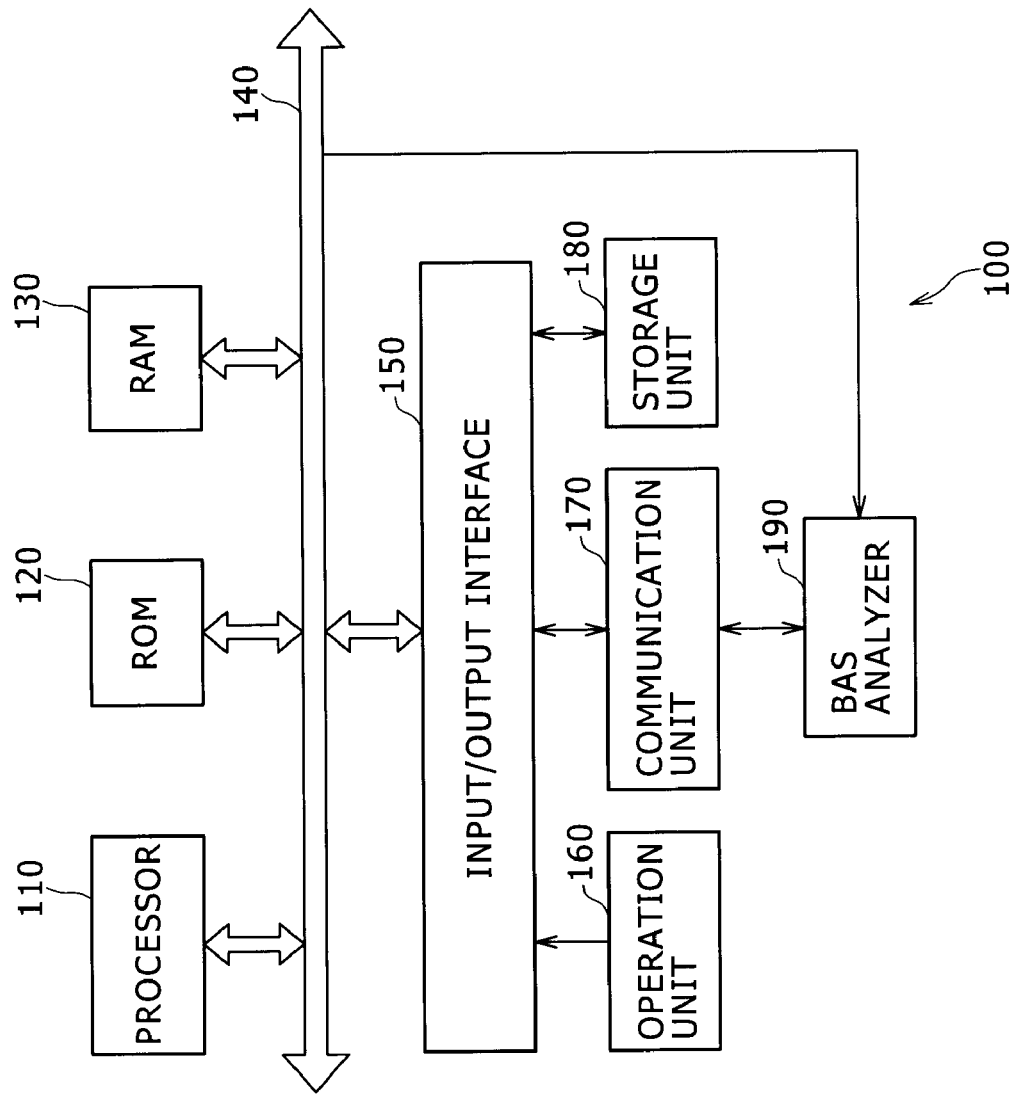
FIG. 2 is a block diagram showing a typical structure of an analyzing apparatus according to an embodiment the present invention.

FIG. 2 is a block diagram showing a typical structure of an analyzing apparatus 100 according to the embodiment of the present invention. The analyzing apparatus 100 includes a processor 110, a ROM 120, a RAM 130, a bus 140, an input/output interface 150, an operation unit 160, a communication unit 170, a storage unit 180, and a bus analyzer 190. The processor 110, ROM 120, and RAM 130 are examples of non-transitory computer readable storage mediums.

The processor 110 performs most of the processes of the analyzing apparatus 100 and is not limited to any specific architecture. The ROM 120 offers a work area necessary for the processor 110 to work in and is typically formed by a nonvolatile memory such as a flash memory. The RAM 130 acts as a main memory that holds the work area necessary for the processor 110 to work in (i.e., representative of the execution state). As such, the RAM 130 is constituted illustratively by a volatile memory such as SDRAM (Synchronous Dynamic Random Access Memory).

The bus 140 permits signal exchanges inside the analyzing apparatus 100. The input/output interface 150 interfaces the bus 140 with the operation unit 160, communication unit 170, and storage unit 180.

The operation unit 160 has buttons that accept operations of the user. With this analyzing apparatus 100, the operation unit 160 includes an analysis termination button used to designate externally the termination of analysis. When the user pushes the analysis termination button, a corresponding signal is transmitted to the processor 110 via the input/output interface 150.

The communication unit 170 works as an interface such as an RS-232C or I2C arrangement to connect with external equipment. The communication protocol for use by the communication unit 170 is not limited to any specific version or variation of technical standards The storage unit 180 is illustratively a hard disk drive that supplements the main memory. The storage unit 180 may accommodate diverse data including the hibernation image and a file system. Alternatively, such data may be held in the ROM 120.

The bus analyzer 190 monitors memory access over the bus 140 to record which memory addresses have been accessed. Generally, the bus analyzer 190 is implemented using a semiconductor device such as FPGA (Field Programmable Gate Array) or PLD (Programmable Logic Devices).

The monitoring of memory access over the bus 140 may be implemented alternatively by software without recourse to the bus analyzer 190. In the ensuing description, the monitoring performed by the bus analyzer 190 will be referred to as the hardware system and the monitoring by software as the software system.

Figure 3:
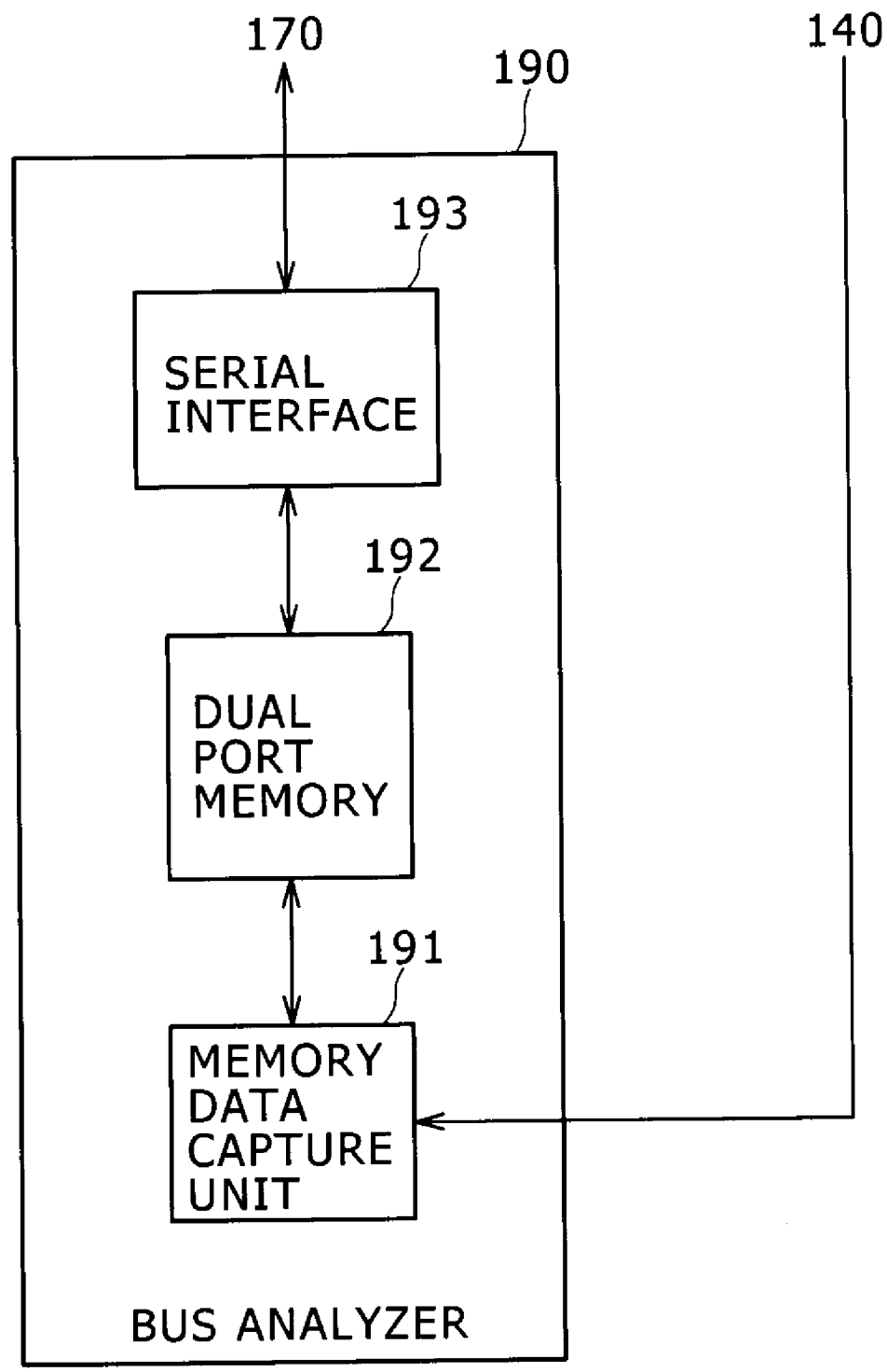
FIG. 3 is a block diagram showing a typical structure of a bus analyzer according to an embodiment the present invention.

FIG. 3 is a block diagram showing a typical structure of the bus analyzer 190 according to embodiment the present invention. The bus analyzer 190 has a memory data capture unit 191, a dual port memory 192, and a serial interface 193.

The memory data capture unit 191 acquires a history of read access from the processor 110 to the RAM 130 via the bus 140. The history of read access acquired by the memory data capture unit 191 is fed to the dual port memory 192.

The dual port memory 192 holds the history of read access acquired by the memory data capture unit 191. The dual port memory 192 has two ports, one connected to the memory data capture unit 191 and the other to the serial interface 193.

The contents to be held in the dual port memory 192 are in increments of page addresses corresponding to the physical addresses accessed by the processor 110. Illustratively, where the operating system is being active, an MMU (Memory Management Unit) of the processor 110 is used for access operations in increments of pages. That means it is pointless to monitor the access in bytes or in words. With this embodiment, memory access is thus monitored in increments of pages. The size of each page is typically 4 KB or 8 KB but is not limited thereto.

In the dual port memory 192, each page is typically assigned one byte. In operation, the dual port memory 192 records how many times each page has been accessed. Illustratively, if the processor 110 performs one read cycle on the RAM 130, the memory data capture unit 191 detects the read cycle of the processor 110 and converts the accessed physical address into a page address. If each page is assumed to have a size of 4 KB, then physical address x00204C00 (the digits following the character "x" constitute a hexadecimal number; ditto for the ensuing description) translates into page address x00204. The memory data capture unit 191 reads one byte of memory contents of the corresponding page at a time from the dual port memory 192, increments the page count by "1," and performs a write back to the corresponding memory location. When the count value has reached its maximum, no further write is carried out. In this manner, the number of times the page in question has been accessed is recorded.

In the foregoing example, each page was shown to be assigned one byte. Alternatively, each page may be assigned one bit while it is arrange to record whether each page has been accessed. As another alternative, the dual port memory 192 may be implemented by use of an FPGA dual port memory library.

The serial interface 193 interfaces to the communication unit 170. A suitable command issued by the processor 110 causes the serial interface 193 to effect a read cycle on the dual port memory 192 from which corresponding data is read. Following parallel-serial conversion, the serial interface 193 conveys what has been read to the processor 110 via the communication unit 170. The serial interface 193 is not limited to any specific protocol or transfer rate.

Figure 4:
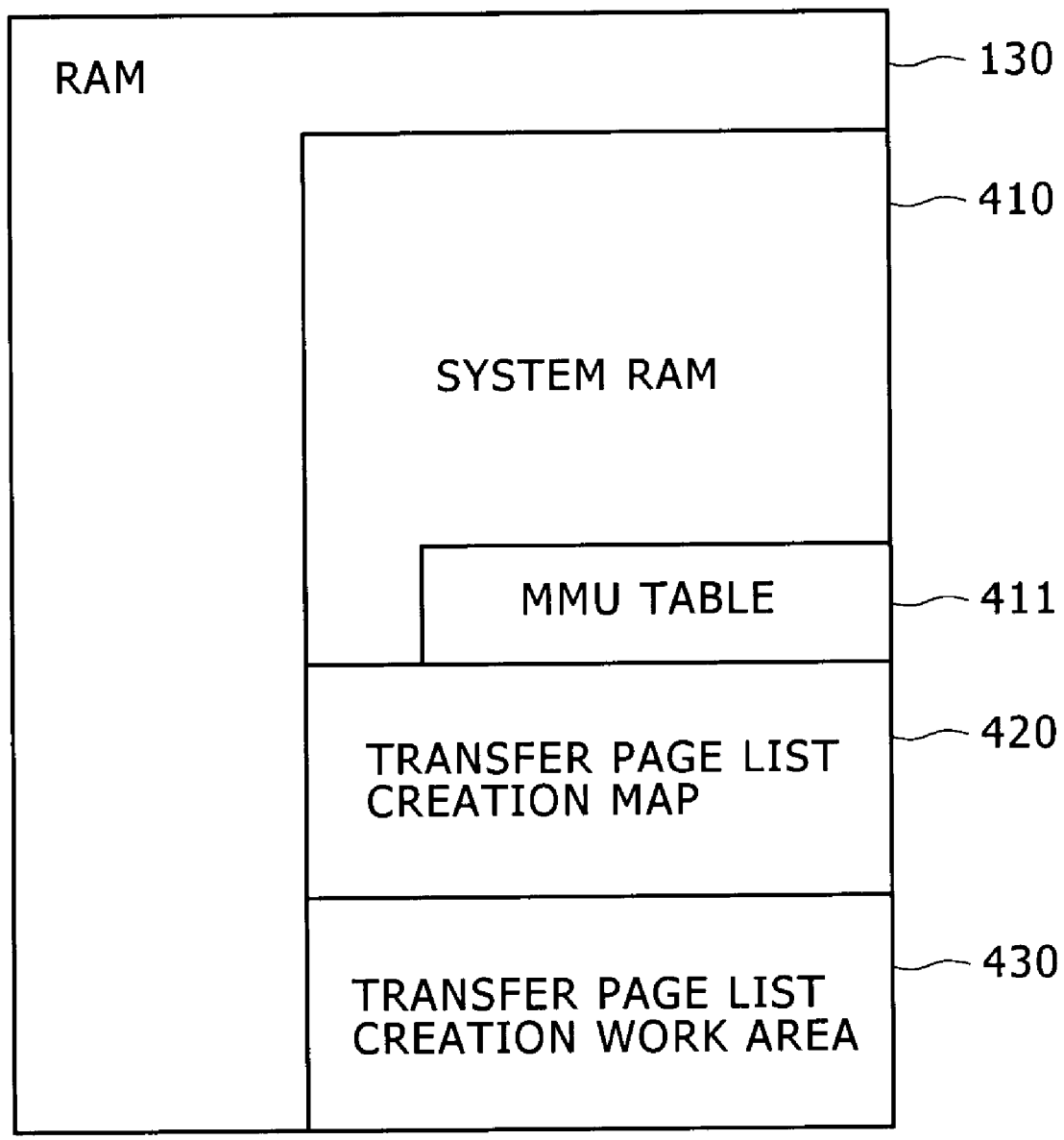
FIG. 4 is a schematic view showing a typical memory map of a RAM in the analyzing apparatus according to an embodiment the present invention.

FIG. 4 is a schematic view showing a typical memory map of the RAM 130 in the analyzing apparatus 100 according to an embodiment of the present invention. The RAM 130 has areas for accommodating a system RAM 410, a transfer page list creation map 420, and a transfer page list creation work area 430.

The system RAM 410 is a RAM area to which the hibernation image is transferred. The system RAM 410 also serves as a storage area necessary for the operating system to work in. Details of the hibernation image will be explained later in conjunction with details of the ROM 120. The hibernation image includes an MMU table 411.

Figure 5:
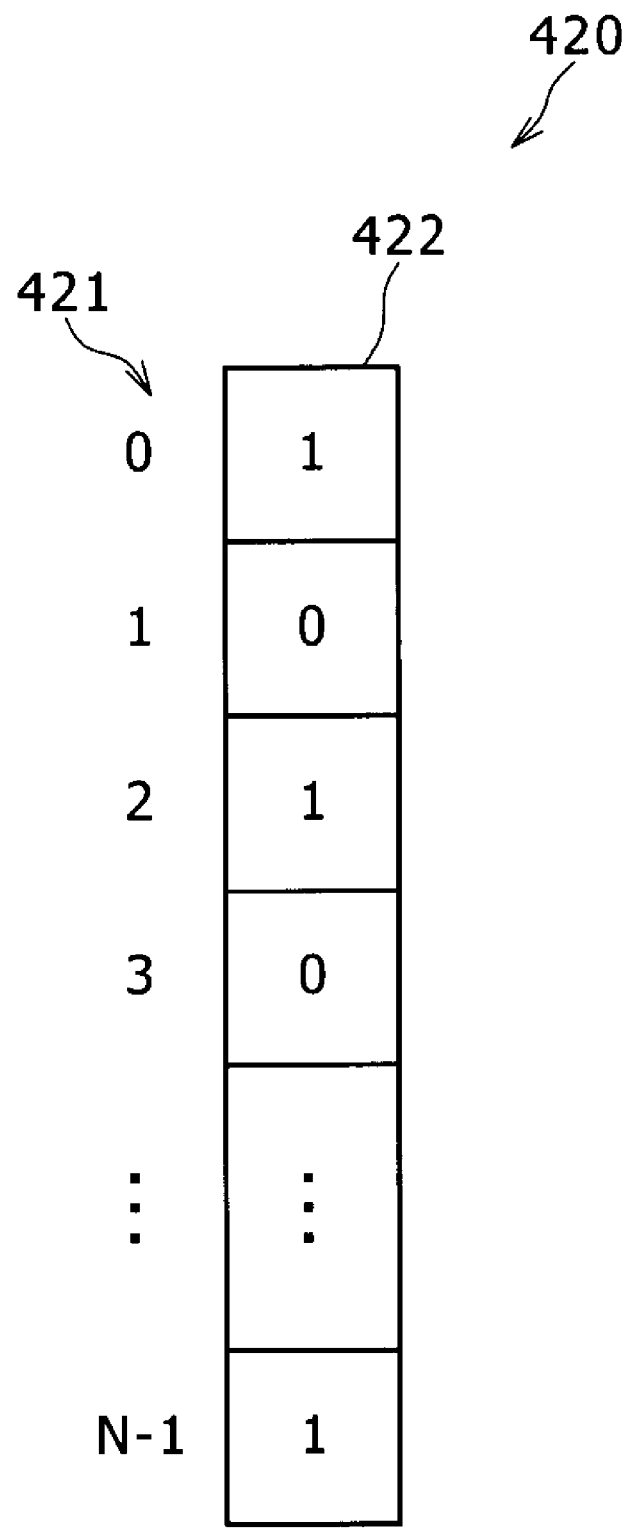
FIG. 5 is a schematic view showing a typical structure of a transfer page list creation map according to an embodiment the present invention.

The transfer page list creation map 420 is used to record the numbers of the pages containing the memory locations accessed while memory access was being monitored. More specifically, as shown in FIG. 5, each of N pages is assigned a one-bit area indicating whether the corresponding area has been accessed (accessed/unaccessed bit 422). Each page including the accessed memory location is represented by an offset 421. The number of each page including an accessed memory location is then recorded. Illustratively, if the accessed/unaccessed bit 422 is set to "1," that means the corresponding page has been accessed; if the bit 422 is "0," that means the corresponding page has not been accessed.

The transfer page list creation work area 430 is used to create the transfer page list 504 from the transfer page list creation map 420. That is, the transfer page list creation work area 430 eventually accommodates a list having the same content as that of the transfer page list 504. This list is extracted by an in-circuit emulator (ICE) or by software offering equivalent processing. The extracted list is retained in the ROM 220 of the executing apparatus as the transfer page list 504.

FIG. 5 is a schematic view showing a typical structure of the transfer page list creation map 420 according to an embodiment of the present invention. The transfer page list creation map 420 is used to record the pages accessed during execution of the operating system.

Each entry in the transfer page list creation map 420 is constituted by an accessed/unaccessed bit 422. The number of entries indicates the number of pages that can accommodate the hibernation image in its entirety. For example, if the size of the hibernation image is represented by SIZE_OF_IMAGE and the size of each page by PAGE_SIZE, then the necessary number of pages NUM_PAGE is defined by the following expression:

NUM_PAGE=(SIZE_OF_IMAGE/PAGE_SIZE)+1

FIG. 6 is a schematic view showing a typical MMU table 700 according to an embodiment of the present invention. For the analyzing apparatus 100, the MMU table 700 is implemented in the form of the MMU table 411 held in the RAM 130. The MMU table 411 is also included in the hibernation image kept in the ROM 120. For an executing apparatus 200 to be discussed later, the MMU table 700 is implemented in the form of an MMU table 611 held in the RAM 230. The MMU table 611 is also included in the hibernation image kept in the ROM 220. The MMU table 700 has entries corresponding to the pages with virtual addresses 710. Each entry includes a physical address 720 of the corresponding page, a page valid flag 730, and a page protection flag 740.

The physical address 720 is a physical address field that corresponds to a virtual address 710. The MMU table 700 is indexed using virtual addresses 710. Given a virtual address, a search is made through the MMU table 700 to find the corresponding physical address 720. This is how translation is made from virtual to physical addresses. If the page valid flag 730 (to be discussed later) of a given page is not set (to indicate invalidity), a page fault is recognized and a page fault handler is invoked.

The page valid flag 730 is a flag that indicates whether the corresponding page is valid. Illustratively, if the page valid flag 730 is set to "1," the corresponding page is valid; if the page valid flag 730 is found to be "0," the corresponding page is invalid. When the page valid flag 730 indicates invalidity, the page fault handler is invoked, as will be discussed later.

The page protection flag 740 is a flag that represents a protection attribute of the corresponding page. Illustratively, if the page protection flag 740 is set to "1," the corresponding page is a privileged page; if the page protection flag 740 is found to be "0," the corresponding page is not privileged.

For this embodiment, it is assumed that pages in the system memory will not be swapped out to an external storage device such as a hard disk drive for swapping or fragmentation purposes.

Figure 7:
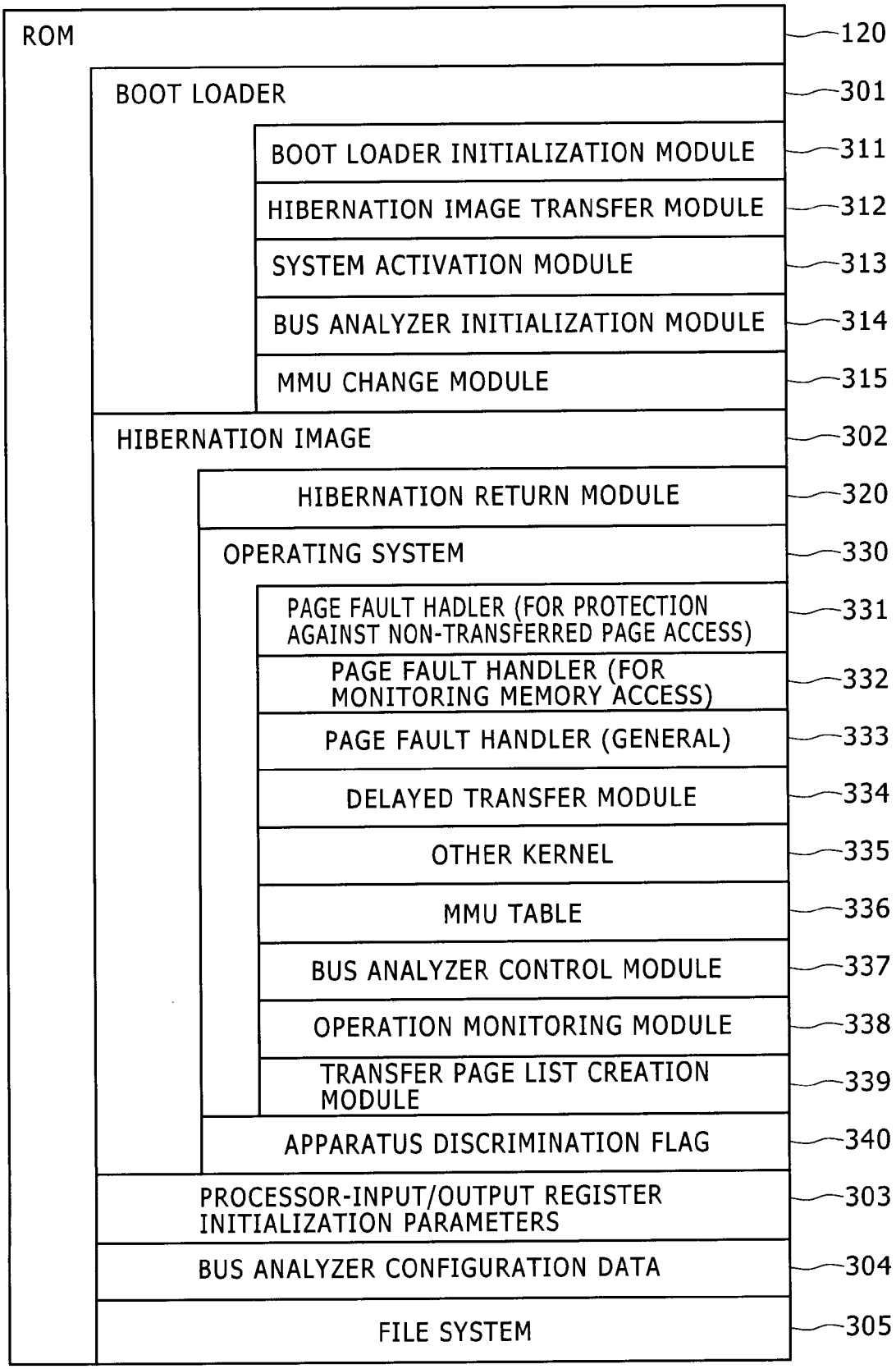
FIG. 7 is a schematic view showing a typical memory map of the ROM in the analyzing apparatus according to an embodiment the present invention.

FIG. 7 is a schematic view showing a typical memory map of the ROM 120 in the analyzing apparatus 100 according to an embodiment of the present invention. The ROM 120 offers areas for accommodating a boot loader 301, a hibernation image 302, processor-input/output register initialization parameters 303, bus analyzer configuration data 304, and a file system 305.

The boot loader 301 is designed to initialize the analyzing apparatus 100 provisionally into a state fit for transferring the hibernation image 302 to the system RAM 410, thereby activating the system. The hibernation image 302 is acquired by saving a memory image of the system RAM 410. The processor-input/output register initialization parameters 303 are used to restore the contents of input/output and processor registers for return from hibernation. The bus analyzer configuration data 304 is circuit data used to activate an FPGA into a state fit for acting as the bus analyzer 190. The file system 305 is a file management system managed by an operating system 330.

The boot loader 301 has program modules including a boot loader initialization module 311, a hibernation image transfer module 312, a system activation module 313, a bus analyzer initialization module 314, and an MMU change module 315.

The boot loader initialization module 311 is a program module that initializes provisionally the analyzing apparatus 100 into a state fit for transferring the hibernation image 302 to the system RAM 410. This process includes initializing the RAM 130 and an MMU table 336.

The hibernation image transfer module 312 is a program module that transfers the hibernation image 302 to the system RAM 410.

The system activation module 313 is a program module that activates the operating system after the hibernation image 302 has been transferred to the system RAM 410. Invoking the hibernation return module 320 causes the system activation module 313 to activate the operating system.

The bus analyzer initialization module 314 is a program module that initializes the bus analyzer 190. Illustratively, where the bus analyzer is formed by an FPGA arrangement, FPGA configuration data may be retrieved from a built-in memory or like storage in the analyzer for configuring work. It should be noted that the bus analyzer initialization module 314 is a program module used by the hardware system and not by the software system.

The MMU change module 315 is a program module that invalidates the page valid flags 730 for the page entries in the MMU table 411 corresponding to the system RAM 410. The page valid flags 730 are set to be valid for the pages corresponding to the transfer page list creation map 420 and transfer page list creation work area 430, as well as for those pages in the system RAM 410 that are necessary for monitoring memory access (i.e., pages constituting a page fault handler 332 (page fault handler for monitoring memory access) and a page fault handler 333 (general-purpose page fault handler) both in the hibernation image 302, and pages containing the MMU table 411). The MMU change module 315 is a program module used by the software system and not by the hardware system.

The hibernation image 302 includes areas making up the hibernation return module 320 (program module), areas constituting the execution state of the operating system 330, and an area used for apparatus discrimination upon hibernation.

The hibernation return module 320 is independent of the operating system 330 and serves as a program module for implementing the activation of hibernation. The system activation module 313 in the boot loader 301 invokes the hibernation return module 320. The hibernation return module 320 first restores the contents of the input/output and processor registers through the use of the processor-input/output register initialization parameters 303 in the ROM 120. The hibernation return module 320 then completes the hibernation process by returning to the address at which hibernation was activated. Following its activation, the operating system 330 mounts the file system 305 for full-fledged operation.

The operating system 330 in the ROM 120 is a memory image of the operating system.

Figure 11:
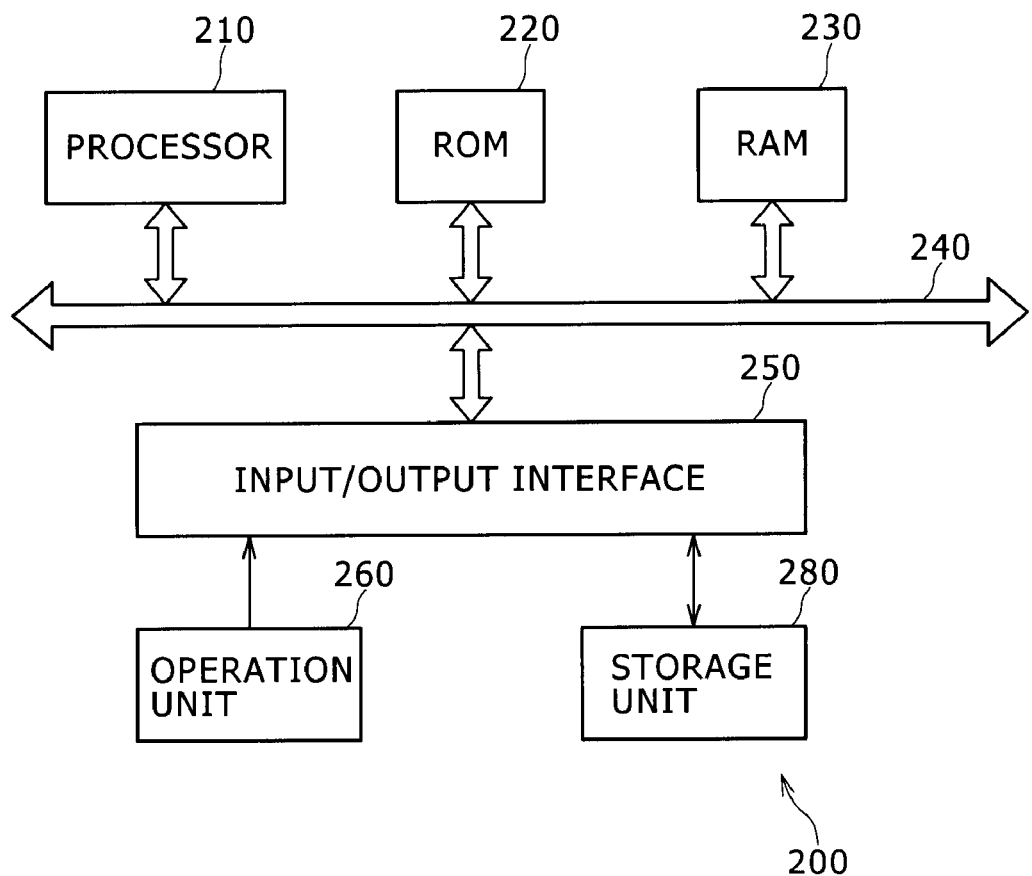
FIG. 11 is a block diagram showing a typical structure of an executing apparatus according to an embodiment the present invention.

The apparatus discrimination flag 340 is a flag that indicates whether the information-processing apparatus is the analyzing apparatus 100 or the executing apparatus 200 (see FIG. 11). For example, the apparatus discrimination flag 340 is set to "1" if the analyzing apparatus 100 is in use and set to "0" if the executing apparatus 200 is in effect.

The execution state of the operating system 330 includes a page fault handler 331 for protection against non-transferred page access, a page fault handler 332 for monitoring memory access, a page fault handler 333 for general purposes, a delayed transfer module 334, other kernel 335, the MMU table 336, a bus analyzer control module 337, an operation monitoring module 338, and a transfer page list creation module 339.

The page fault handler 331 for protection against non-transferred page access is a page fault handler that acts when a page yet to be transferred from the ROM 220 to the RAM 230 is accessed in the executing apparatus 200, the page fault handler transferring the necessary page from the ROM to the RAM. That is, this page fault handler 331 is not used in conjunction with the analyzing apparatus 100.

The page fault handler 332 for memory access monitoring is used to acquire a history of previously accessed pages in a setup where the analyzing apparatus 100 adopts the software system. In operation, the page fault handler 332 analyzes a given page on which a page fault occurred, records the occurrence of access to that entry in transfer page list creation page 420 which corresponds to the page involved, and sets the page valid flag 730 to be valid for that entry in the MMU table 411 which corresponds to the page in question so that a page fault will not occur upon subsequent access to the page. Thereafter, control is returned to the address where the page fault occurred.

The page fault handler 333 for general purposes is the first page fault handler to be invoked upon page fault. When a page fault occurs because the processor 110 has attempted invalid access (i.e., to an invalid page or to a page the processor is not privileged to access), the page fault handler 333 is called up. Where the apparatus discrimination flag 340 points to the analyzing apparatus 100, the page fault handler 332 for memory access monitoring is invoked.

The delayed transfer module 334 is a program module that effects page transfer from the ROM 220 to the RAM 230 after the execution of the operating system has been started on the executing apparatus 200. That is, the delayed transfer module 334 is not used in conjunction with the analyzing apparatus 100.

The MMU table 336 corresponds to the MMU table 700 explained above in reference to FIG. 6. This is a table for use by the MMU in translating virtual addresses to corresponding physical addresses or for protection against access to particular pages.

The bus analyzer control module 337 is a program module that acquires memory access information from the bus analyzer 190 in a setup where the hardware system is adopted. That is, the bus analyzer control module 337 is used solely in conjunction with the hardware system and serves to ensure communication between the processor 110 and the bus analyzer 190.

Illustratively, there are five commands that may be issued from the bus analyzer control module 337 to the bus analyzer 190: (1) a command for initializing the bus analyzer, (2) a command for resetting recorded contents, (3) a command to start recording, (4) a command to terminate recording, and (5) a command for acquiring recorded results. The bus analyzer initialization command (1) is used where the bus analyzer 190 is implemented by the FPGA or like arrangement. This command is issued so as to supply the FPGA with the bus analyzer configuration data 304 for causing the FPGA to act as the bus analyzer 190. This process is implemented alternatively by the bus analyzer initialization module 314. The recorded content resetting command (2) is used to reset all contents of the dual port memory 192 of the bus analyzer 190. This command turns all access records into an "unaccessed memory" state. The recording start command (3) is issued so as to start monitoring memory access. This command is furnished by the system activation module 313. The recording end command (4) is used to terminate the memory access monitoring. This command is provided by the operation monitoring module 338. The recorded result acquisition command (5) is used to acquire the recorded results of memory access from the bus analyzer 190.

The operation monitoring module 338 is a program module that monitors whether a monitoring termination button is pushed on the operation unit 160. When the button is found to be pushed, the operation monitoring module 338 tells the transfer page list creation module 339 to start its processing.

The transfer page list creation module 339 is a program module that creates the transfer page list 504 from the transfer page list creation map 420. Where the hardware system is adopted, the transfer page list creation module 339 acquires memory access information from the bus analyzer 190 via the bus analyzer control module 337 and converts the acquired information into the transfer page list creation map 420. Where the software system is in use, the transfer page list creation module 339 converts the transfer page list creation map 420 in the RAM 130 into the transfer page list 504.

Figure 8:
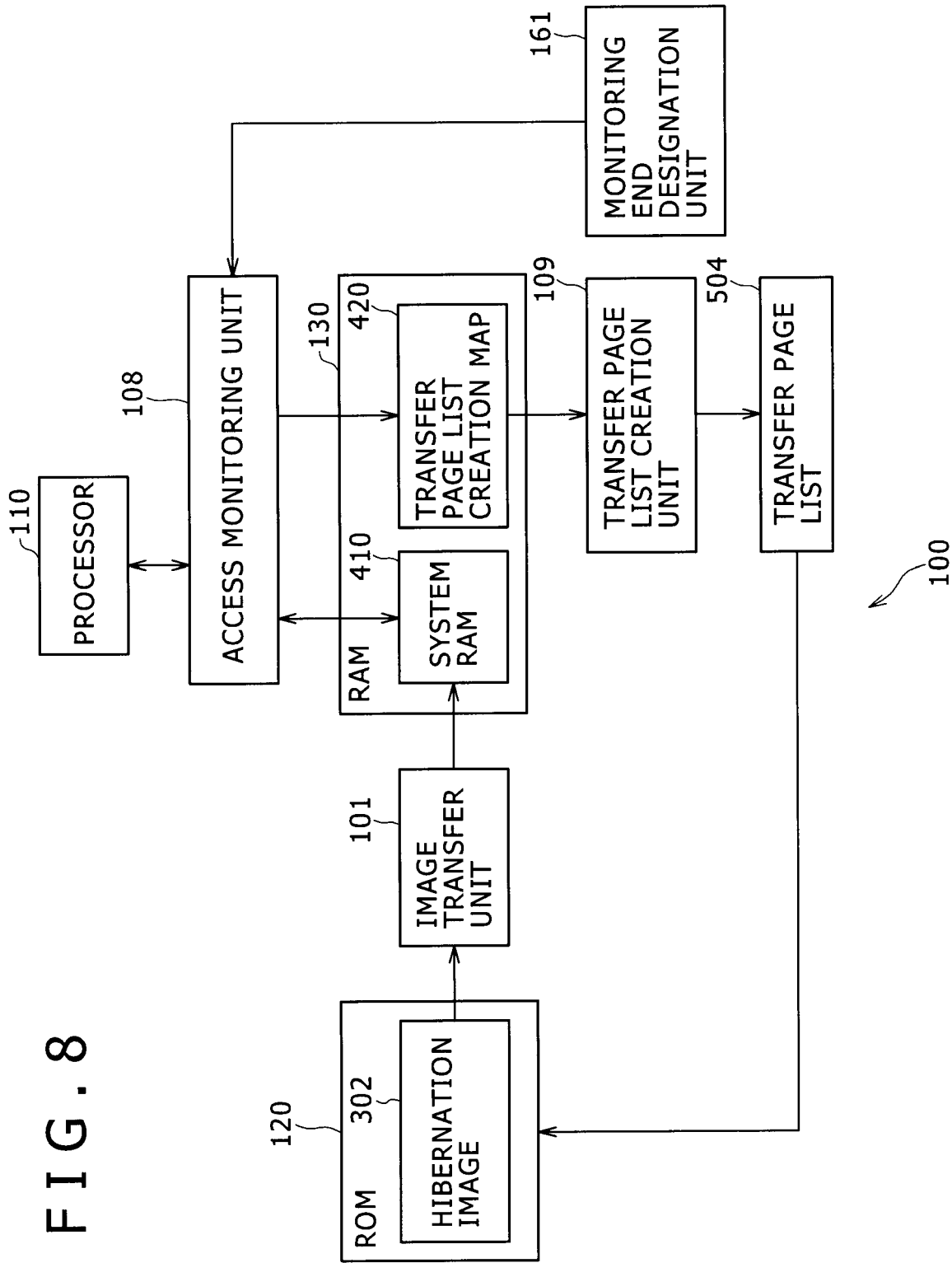
FIG. 8 is a block diagram showing a typical functional structure of the analyzing apparatus according to an embodiment the present invention.

FIG. 8 is a block diagram showing a typical functional structure of the analyzing apparatus 100 according to an embodiment of the present invention. As discussed above in reference to FIG. 2, the analyzing apparatus 100 includes the processor 110, ROM 120, and RAM 130. The ROM 120 holds the hibernation image 302. The RAM 130 has areas for accommodating the system RAM 410 and transfer page list creation map 420.

The analyzing apparatus 100 further includes an image transfer unit 101, an access monitoring unit 108, a transfer page list creation unit 109, and a monitoring end designation unit 161. The image transfer unit 101 is implemented by a suitable program (e.g., hibernation image transfer module 312) running on the processor 110. The access monitoring unit 108 is implemented by the bus analyzer 190 for the hardware system or practiced by an appropriate program (e.g., page fault handler 332) running on the processor 110 for the software system. The monitoring end designation unit 161 is implemented using the monitoring termination button of the operation unit 160. The transfer page list creation unit 109 is practiced by a suitable program (e.g., transfer page list creation module 339) running on the processor 110.

The image transfer unit 101 works to transfer the hibernation image 302 to the system RAM 410. With the analyzing apparatus 100, the entire hibernation image 302 is transferred to the system RAM 410.

Upon system activation, the access monitoring unit 108 monitors read access operations on the RAM 130 by the processor 110. Termination of the monitoring process is designated by the monitoring end designation unit 161. With the monitoring process terminated, the transfer page list creation map 420 is created in the RAM 130.

The transfer page list creation unit 109 works to create the transfer page list 504 from the transfer page list creation map 420. The transfer page list 504 thus created is saved into the ROM 120.

Figure 9:
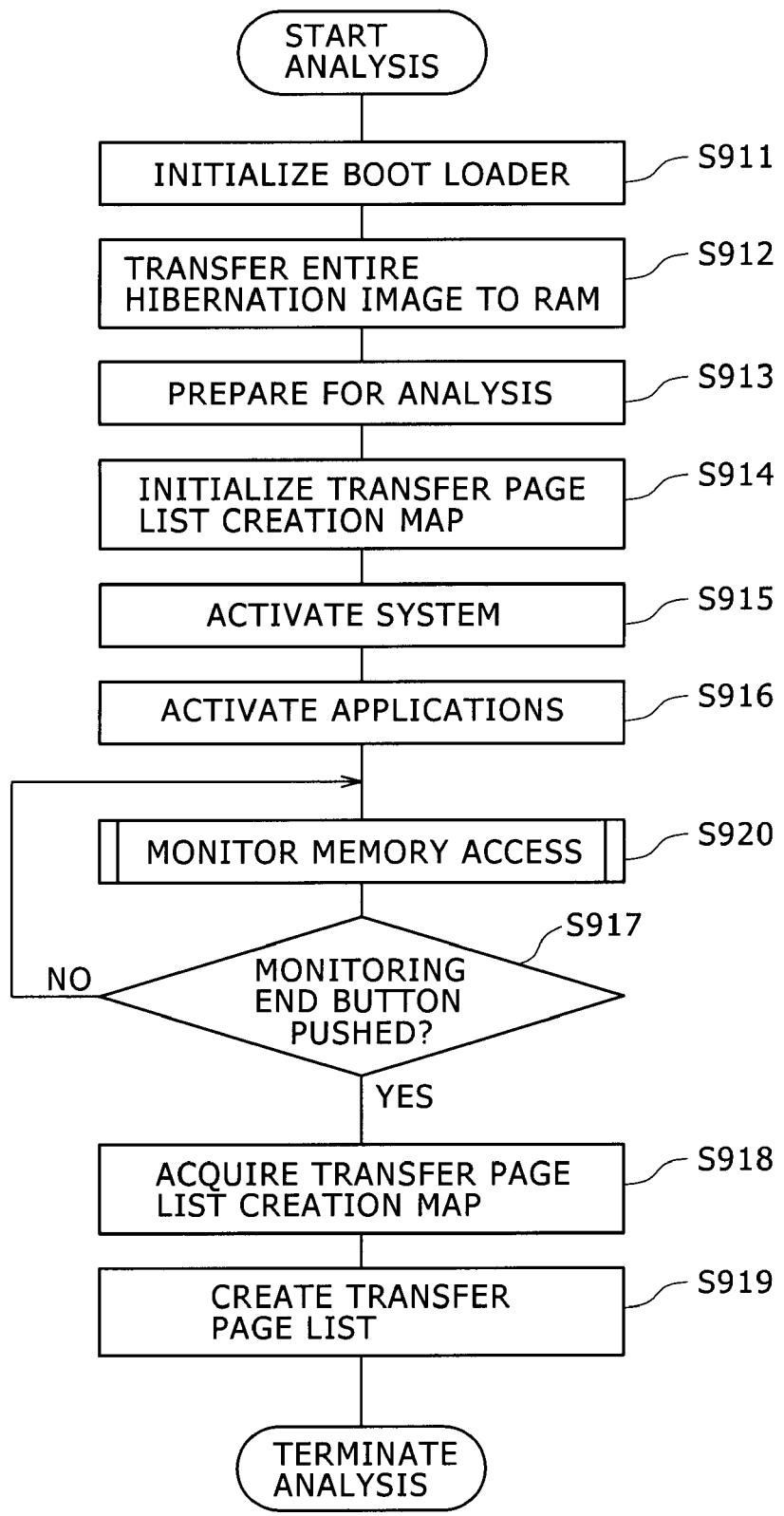
FIG. 9 is a flowchart of steps constituting a typical procedure performed by the analyzing apparatus in a manner according to an embodiment the present invention.

FIG. 9 is a flowchart of steps constituting a typical procedure performed by the analyzing apparatus 100 in a manner according to an embodiment of the present invention. When the analyzing apparatus 100 is switched on, the boot loader initialization module 311 initializes the boot loader 301 in step S911. The initialization involves initializing the RAM 130 and the MMU and making other settings necessary for transferring the hibernation image 302. In step S912, the hibernation image 302 in its entirety is transferred to the system RAM 410.

In step S913, preparations are carried out for access analysis. More specifically, the entries in the MMU table 411 of the MMU change module 315 are updated in the case of the software system, or the bus analyzer 190 is initialized in the case of the hardware system.

In step S914, the transfer page list creation map 420 as a whole is initialized into a state of unaccessed entries. In step S915, the system activation module 313 activates the operating system. That is, a jump is made to the entry of the hibernation return module 320. With hibernation activation completed, the operating system 330 is activated. In step S916, applications are activated on the operating system 330.

In step S920, memory access is monitored while the operating system 330 (and applications) remains active. The monitoring of memory access continues until the monitoring termination button is pushed in step S917.

Every time a read operation is performed on the system RAM 410, the access to the page containing the read-out memory address is recorded. Access monitoring is carried out either by the software system or by the hardware system.

In the case of the software system, a page fault occurs every time the memory is accessed, and the page fault handler 332 records a history of the access in question to the transfer page list creation map 420. When the page is once recorded to be accessed, the page valid flag 730 for the corresponding entry in the MMU table 411 is set to be valid. Then a page fault will not occur when that page is accessed from the second time on.

Where the hardware system is in use, access records are taken inside the bus analyzer 190. Illustratively in the case of an SRAM (Static Random Access Memory), such signals as an address signal (AD#), a chip select signal (CS#) and a data read (RD#) are monitored. When the processor 110 issues a read cycle, these signals are asserted. The bus analyzer 190 detects the asserted signals, acquires the physical address in effect when the signals are found asserted, translates the acquired address into the page address mentioned above, and stores the number of times the page in question has been accessed in the dual port memory 192 of the bus analyzer 190.

With the monitoring of access completed, the transfer page list creation module 339 acquires the transfer page list creation map 420 in step S918. Where the software system is adopted, the transfer page list creation map 420 in the memory is utilized. Where the hardware system is in effect, the bus analyzer control module 337 acquires access record data and converts the acquired data into the format of the transfer page list creation map 420.

Thereafter, the transfer page list creation module 339 converts the transfer page list creation map 420 into the format of the transfer page list 504 in step S919.

Figure 10:
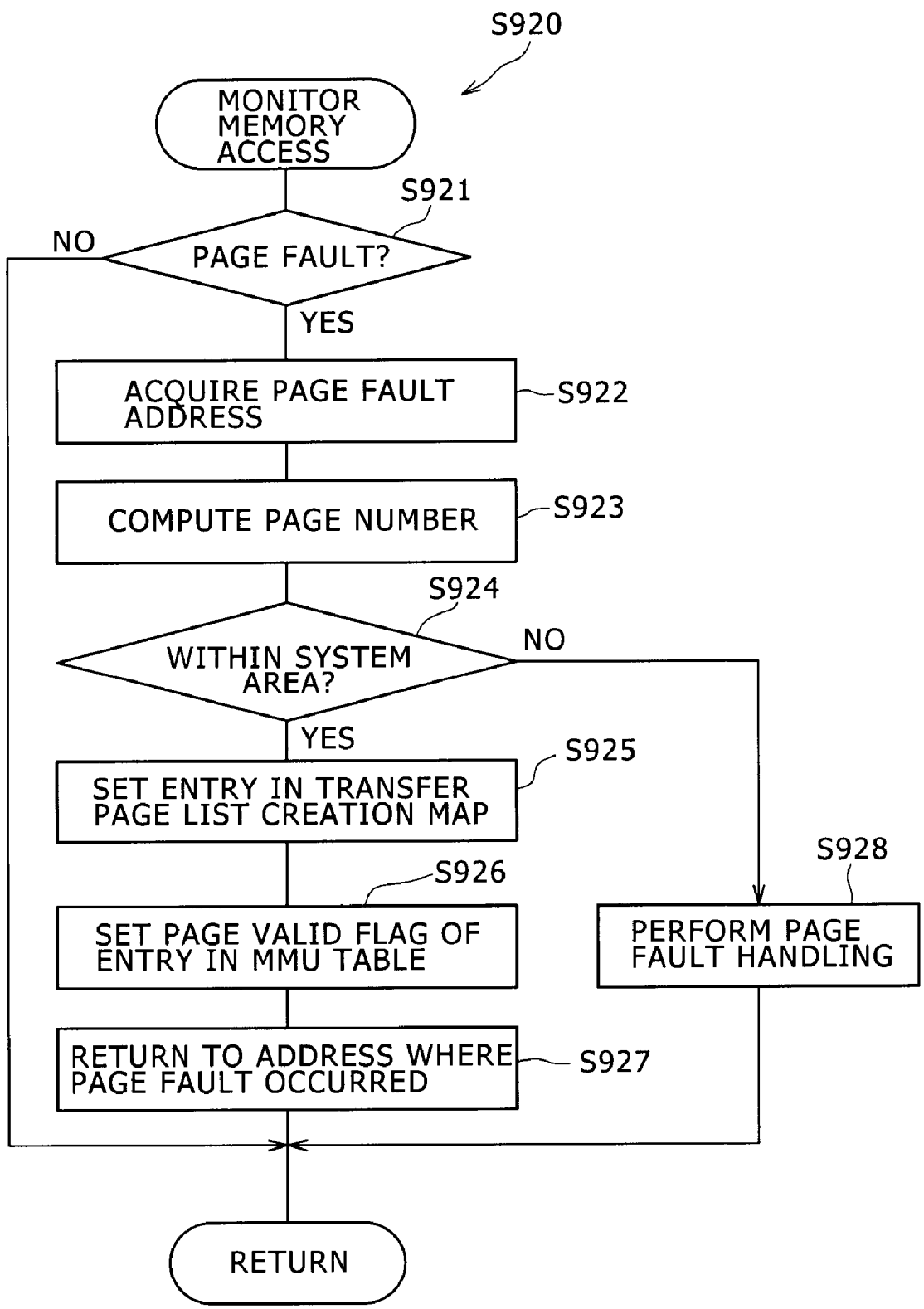
FIG. 10 is a flowchart of steps constituting a typical memory access monitoring procedure performed by the analyzing apparatus in a manner according to an embodiment the present invention.

FIG. 10 is a flowchart of steps constituting a typical memory access monitoring procedure (corresponding to step S920 in FIG. 9) performed by the analyzing apparatus 100 in a manner according to an embodiment of the present invention.

When a read access operation is performed for the first time on the same page by the processor 110, a page fault takes place in step S921. With the page fault recognized, the steps below are carried out.

In step S922, the address at which the page fault occurred is acquired. In step S922, the page number (PAGE_NUM) of the page containing the address where the page fault took place is computed in step S923.

If the address at which the page fault was recognized is found to be outside the system RAM 410 in step S924, ordinary page fault handling is performed in step S928. In the case of a built-in system, the system is brought to an end at this point.

If the address at which the page fault occurred is found to be inside the system RAM 410 in step S924, then the data of that entry in the transfer page list creation map 420 which corresponds to the page number (PAGE_NUM) containing the address where the page fault took place is set to have been accessed in step S925. In step S926, the page valid flag 730 is set to be valid for that entry in the MMU table 411 which corresponds to the page number (PAGE_NUM) containing the address where the page fault occurred. In step S927, control is returned to the address where the page fault was recognized.

FIG. 11 is a block diagram showing a typical structure of the executing apparatus 200 according to an embodiment of the present invention. The executing apparatus 200 includes a processor 210, a ROM 220, a RAM 230, a bus 240, an input/output interface 250, an operation unit 260, and a storage unit 280.

The component units above are the same in structure as the processor 110, ROM 120, RAM 130, bus 140, input/output interface 150, operation unit 160, and storage unit 180 of the analyzing apparatus 100 shown in FIG. 2 and thus will not be discussed further. Unlike the analyzing apparatus 100, the executing apparatus 200 has no need to acquire the history of memory access and thus does not include components corresponding to the bus analyzer 190 and communication unit 170 of the analyzing apparatus 100.

Figure 12:
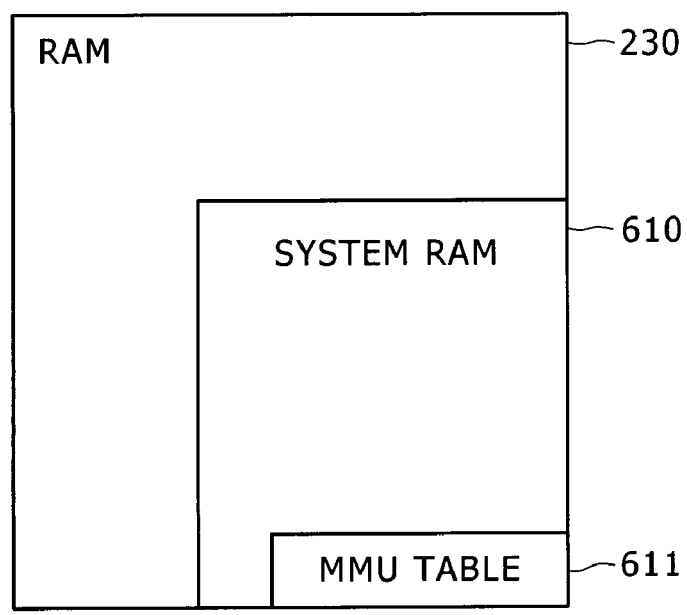
FIG. 12 is a schematic view showing a typical memory map of a RAM in the executing apparatus according to an embodiment the present invention.

FIG. 12 is a schematic view showing a typical memory map of the RAM 230 in the executing apparatus 200 according to an embodiment of the present invention. The RAM 230 offers areas making up a system RAM 610. The RAM 230 has no areas corresponding to the transfer page list creation map 420 and transfer page list creation work area 430. That is because unlike the analyzing apparatus 100, the executing apparatus 200 need not acquire the history of memory access.

As with the system RAM 410, the system RAM 610 is a RAM area to which the hibernation image is transferred. The system RAM 610 includes an MMU table 611.

Figure 13:
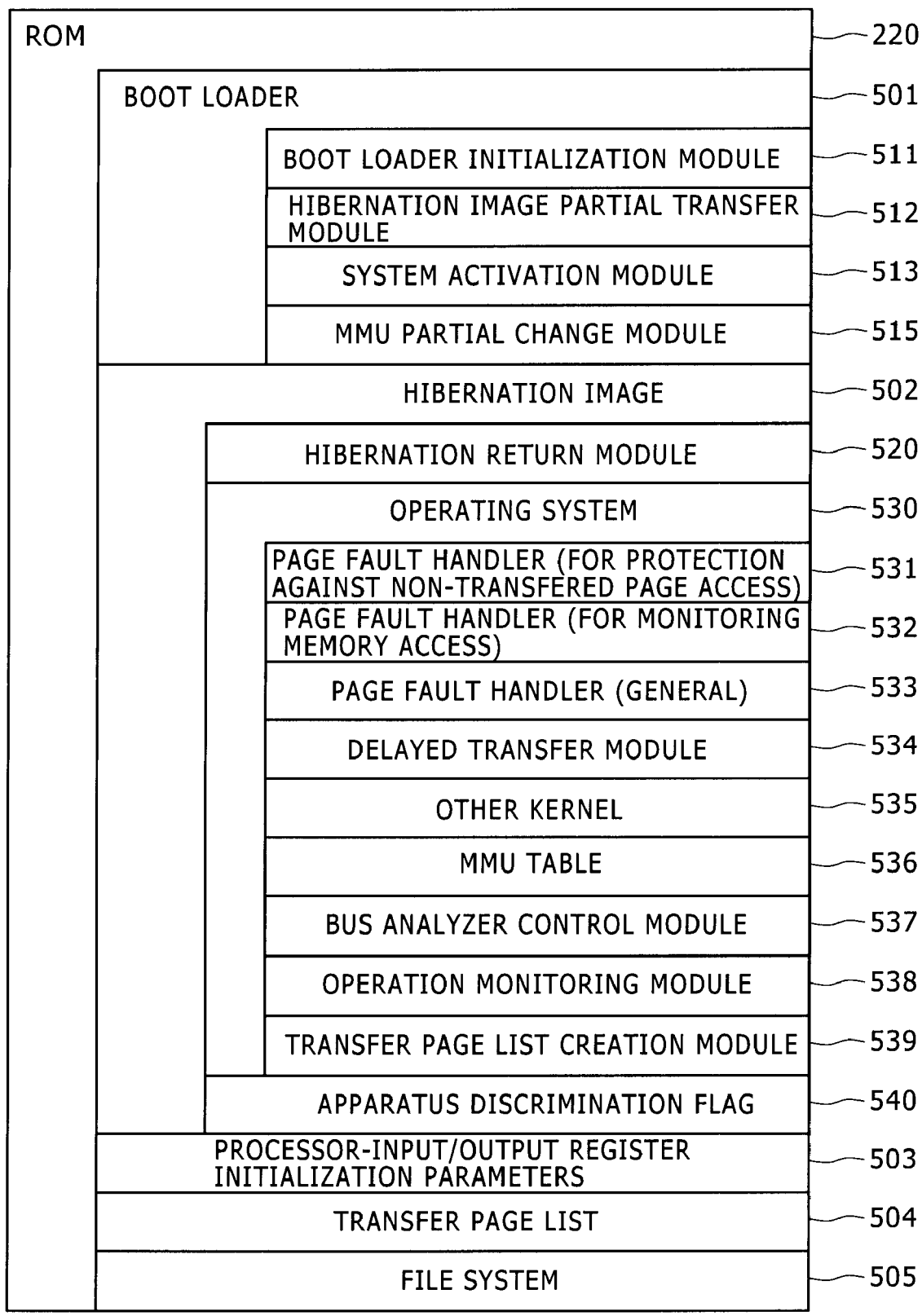
FIG. 13 is a schematic view showing a typical memory map of a ROM in the executing apparatus according to an embodiment the present invention.

FIG. 13 is a schematic view showing a typical memory map of the ROM 220 in the executing apparatus 200 according to an embodiment of the present invention. The ROM 220 offers areas for accommodating a boot loader 501, a hibernation image 502, processor-input/output register initialization parameters 503, a transfer page list 504, and a file system 505.

Of the elements in the above-mentioned areas of the ROM 220, the hibernation image 502, processor-input/output register initialization parameters 503, and file system 505 are the same as the hibernation image 302, processor-input/output register initialization parameters 303, and file system 305 of the analyzing apparatus 100 and thus will not be described further.

The boot loader 501 provisionally initializes the executing apparatus 200 into a state fit for transferring the hibernation image 502 to the system RAM 610 in order to activate the operating system. The boot loader 501 has program modules including a boot loader initialization module 511, a hibernation image partial transfer module 512, a system activation module 513, and an MMU partial change module 515.

The boot loader initialization module 511 is the same in function as the boot loader initialization module 311 for the analyzing apparatus 100. This is a program module that initializes the executing apparatus 200 provisionally into a state fit for transferring the hibernation image 502. The initialization process involves initiating the RAM 230 and the MMU.

The hibernation image partial transfer module 512 is a program module that transfers part of the hibernation image 502 in advance to the system RAM 610. Only those pages of the hibernation image 502 which correspond to the pages included in the transfer page list 504 are transferred by the hibernation image partial transfer module 512.

The system activation module 513 is the same in function as the system activation module 313 for the analyzing apparatus 100. This is a program module that activates the system after the hibernation image 503 has been partially transferred in advance. The system activation module 513 invokes the hibernation return module 520 in order to activate the operating system.

The MMU partial change module 515 is a program module that invalidates the page valid flags 730 for particular entries in the MMU table 611 corresponding to the system RAM 610, the entries all representing the pages not transferred by the hibernation image partial transfer module 512 (the pages are called non-transferred pages).

Thereafter, an attempt to access a non-transferred page in the hibernation image 502 in the system RAM 610 causes a page fault. Every time a non-transferred page is accessed after activation of the operating system, a page fault handler 531 for protection against non-transferred page access is called up via a page fault handler 533 of the operating system.

The page fault handler 531 for protection against non-transferred page access transfers that page in the hibernation image 502 which corresponds to the non-transferred page, to a suitable location in the system RAM 610, sets the page valid flag 730 to be valid for the entry corresponding to the page in question, and returns control to the address where the page fault took place (i.e., returns to the state in effect before the page fault). Then a page fault will not occur when the page in question is subsequently accessed.

The pages to be accessed during a predetermined time period following system activation are supposed to have been transferred by the hibernation image partial transfer module 512. However, the above-mentioned processing may be needed because there is a possibility that an unaccessed memory location is accessed by an RTC interrupt or by the user's unexpected operation after the history of access to the memory was recorded by the analyzing apparatus 100.

The hibernation return module 520 brings about hibernation by restoring the contents of the input/output and processor registers using the processor-input/output register initialization parameters 503 in the ROM 220 and by jumping to the address in effect when the hibernation image 502 was saved. Following its activation, the operating system mounts the file system 505 for full-fledged operation.

Like the apparatus discrimination flag 340 in the ROM 120, an apparatus discrimination flag 540 is a flag that indicates whether the information-processing apparatus is the analyzing apparatus 100 or the executing apparatus 200. On referencing the apparatus discrimination flag 540, the page fault handler 533 determines whether the analyzing apparatus 100 or the executing apparatus 200 is in use and decides on which handler to invoke. If the analyzing apparatus 100 is found to be in use, the page fault handler 531 for protection against non-transferred page access is invoked. If the executing apparatus 200 is found to be in effect upon reference to the apparatus discrimination flag 540, a delayed transfer module 534 activates itself.

The page fault handler 533, other kernel 535, and an MMU table 536 in the operating system 530 are functionally the same as their counterparts in the original operating system.

The page fault handler 533 is invoked when a page fault occurs. When a page fault is recognized because the processor 210 has attempted invalid access (i.e., to an invalid page or to a page the processor is not privileged to access), the page fault handler 533 is called up. Where the apparatus discrimination flag 540 points to the executing apparatus 200, the page fault handler 532 for protection against non-transferred page access is invoked.

The MMU table 536 is a table for use by the MMU in translating virtual addresses to corresponding physical addresses or for protection against access to particular pages.

A bus analyzer control module 537, an operation monitoring module 538, and a transfer page list creation module 539 are not used with the executing apparatus 200. Still, the hibernation image 502 needs to be retained to make sure that the results of memory access remain consistent with those of the analyzing apparatus 100.

Figure 14:
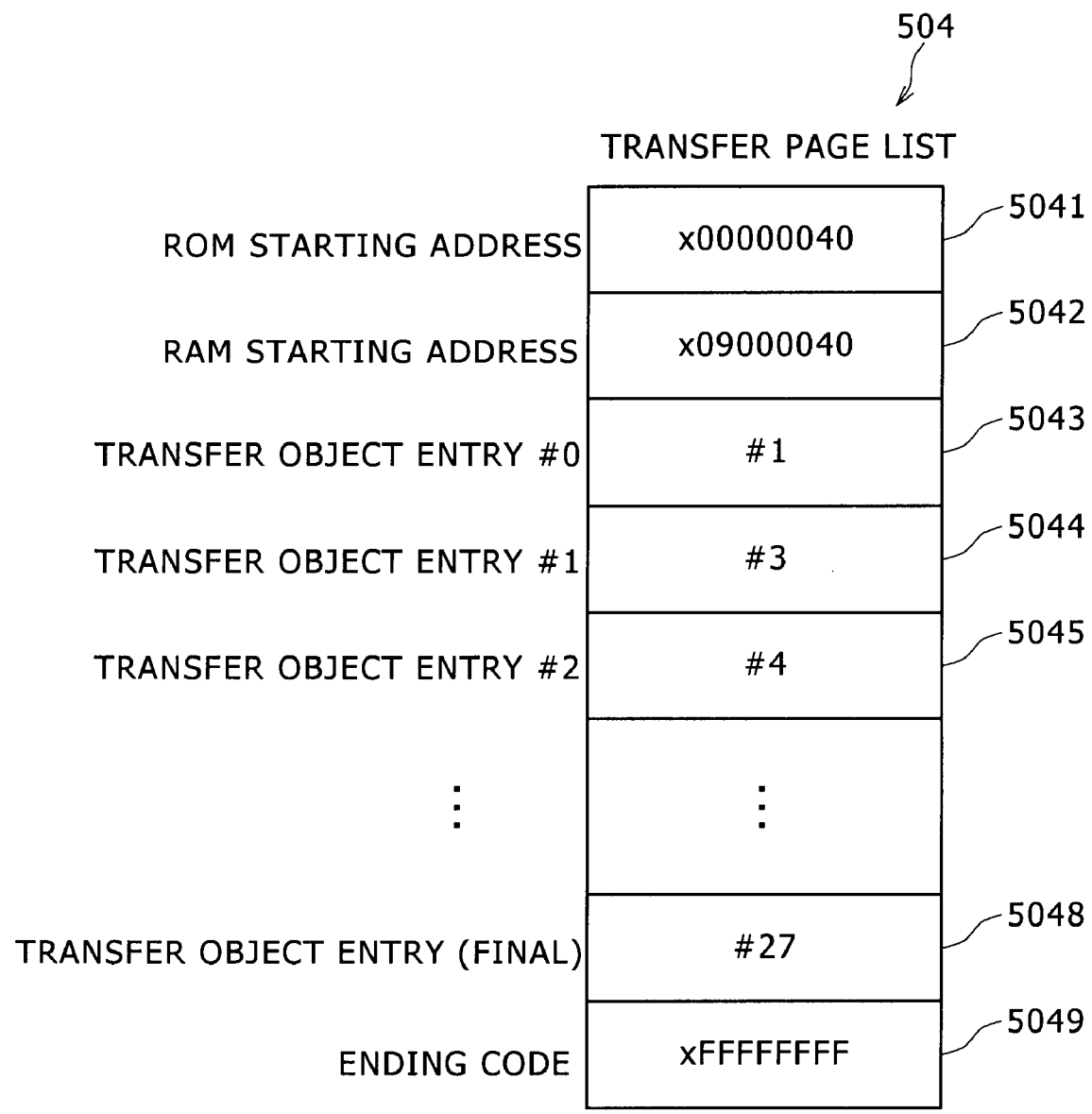
FIG. 14 is a schematic view showing a typical structure of a transfer page list according to an embodiment the present invention.

FIG. 14 is a schematic view showing a typical structure of the transfer page list 504 according to an embodiment of the present invention. The transfer page list 504 includes a ROM starting address 5041, a RAM starting address 5042, transfer object entries 5043 through 5048, and an ending code 5049.

The ROM starting address 5041 holds the first address from which to start transferring data out of the ROM 220. The RAM starting address 5042 accommodates the first address to which to start transferring data inside the RAM 230. More specifically, the RAM starting address 5042 is the first physical address of the system RAM 610.

The transfer object entries 5043 through 5048 accommodate the page numbers of the pages to be transferred. The number of transfer object entries is variable. The final transfer object entry is suffixed with the ending code 5049. The ending code 5049 is composed of a value that is not used as a page number (e.g., xFFFFFFFF).

Figure 15:
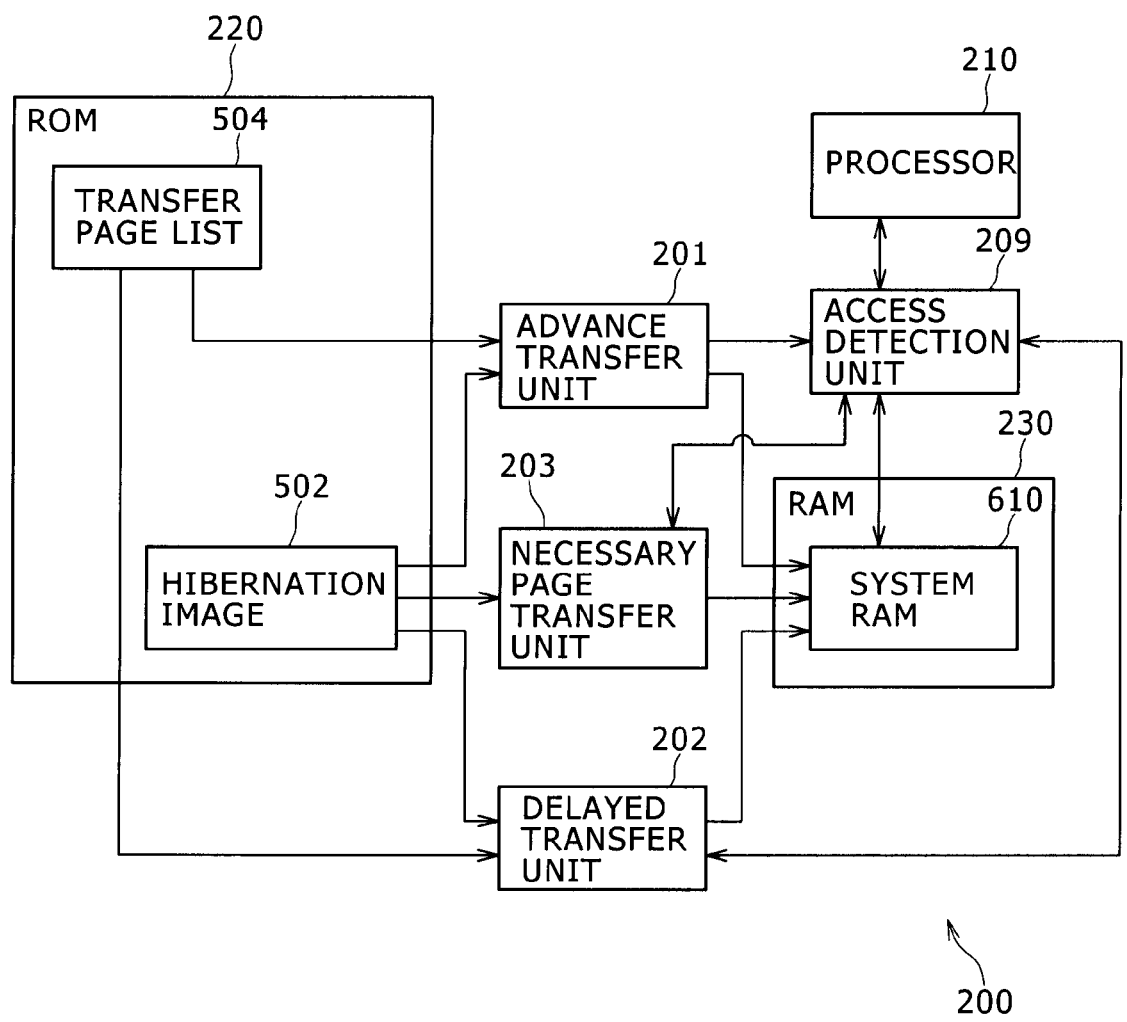
FIG. 15 is a block diagram showing a typical functional structure of the executing apparatus according to an embodiment the present invention.

FIG. 15 is a block diagram showing a typical functional structure of the executing apparatus 200 according to an embodiment of the present invention. As explained above in reference to FIG. 11, the executing apparatus has the processor 210, ROM 220, and RAM 230. The ROM 220 holds the hibernation image 502 and transfer page list 504. The RAM 230 has areas accommodating the system RAM 610.

The executing apparatus 200 also includes an advance transfer unit 201, a delayed transfer unit 202, a necessary page transfer unit 203, and an access detection unit 209. The advance transfer unit 201 is implemented by a program (e.g., hibernation image partial transfer module 512), the delayed transfer unit 202 by another program (e.g., delayed transfer module 534), the necessary page transfer unit 203 by another program (e.g., page fault handler 531), and the access detection unit 209 by another program (e.g., page fault handler 533), all programs running on the processor 110.

The advance transfer unit 201 transfers those transfer object pages in the transfer page list 504 which are to be transferred from the hibernation image 502 to the system RAM 610. The advance page transfer of the advance transfer unit 201 is carried out upon boot-up by the hibernation image partial transfer module 512 in the boot loader 501.

Following activation of the operating system at the end of the advance transfer by the advance transfer unit 201, the delayed transfer unit 202 transfers the pages other than the transfer object pages shown in the transfer page list 502 from the hibernation image 502 to the system RAM 610. The delayed transfer of the delayed transfer unit 202 takes place in parallel with the execution of other application programs being performed by the delayed transfer module 534 of the operating system 530. At this point, the delayed transfer unit 202 may reference the transfer page list 504 or may check the entire MMU table 611, as will be described later.

Following activation of the operating system at the end of the advance transfer by the advance transfer unit 201 and prior to the delayed transfer by the delayed transfer unit 202, the necessary page transfer unit 203 transfers any non-transferred page being accessed from the hibernation image 502 to the system RAM 610. This dynamic transfer of the necessary page transfer unit 203 is carried out by the page fault handler 531 when a page fault is recognized.

The access detection unit 209 detects access to a memory location by the processor 210, translates the logical address of that location into a corresponding physical address, and changes the MMU table 611 accordingly. Every time a page is transferred from the hibernation image 502 to the system RAM 610, the access detection unit 209 sets the page valid flag 730 of the corresponding entry to be valid in the MMU table 611.

Figure 16:
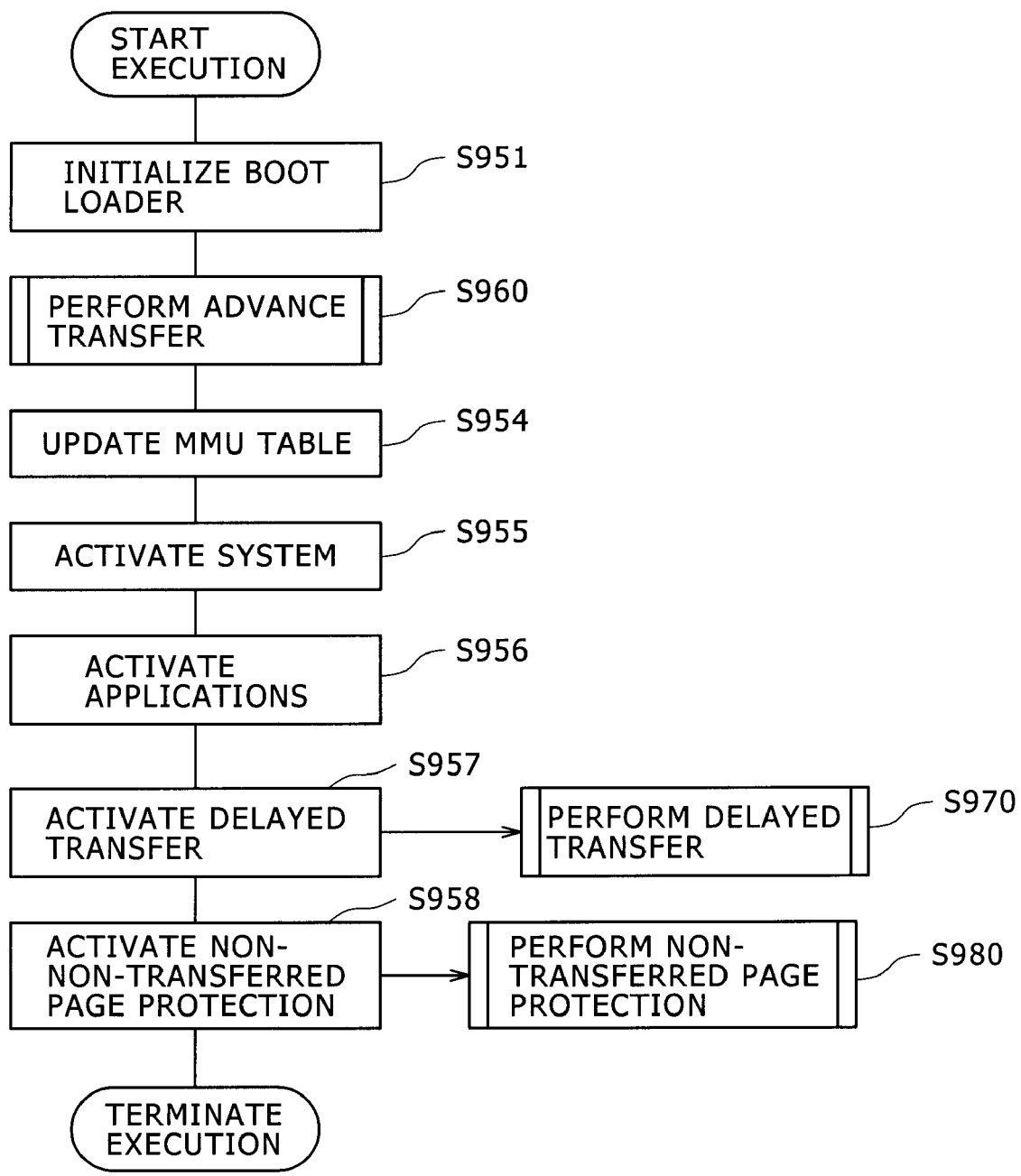
FIG. 16 is a flowchart of steps constituting a typical procedure performed by the executing apparatus in a manner according to an embodiment the invention.

FIG. 16 is a flowchart of steps constituting a typical procedure performed by the executing apparatus 200 in a manner according to an embodiment of the invention. When the executing apparatus 200 is switched on, the boot loader 501 is initialized by the boot loader initialization module 511 in step S951. The initialization process involves initializing the RAM 230 and the MMU to get ready for transferring the hibernation image 502. Thereafter, the hibernation image partial transfer module 512 transfers part of the hibernation image 502 in advance to the system RAM 610 according to the transfer page list 504 in step S960.

In step S954, the MMU partial change module 515 updates the entries in the MMU table 611. More specifically, the MMU partial change module 515 invalidates the page valid flags 730 of all those entries in the MMU table 611 which correspond to the pages not transferred in advance. Thereafter, if a non-transferred page is accessed, a page fault takes place.

In step S955, the system activation module 513 activates the operating system. More specifically, the system activation module 513 jumps to the entry of the hibernation return module 520, completes hibernation activation, and activates the operating system 530. In step S956, applications are activated on the operating system 530. In step S957, delayed transfer is activated. In step S958, non-transferred page protection is activated. In this manner, the processing of applications is paralleled by the delayed transfer in step S970 and by the protection of non-transferred pages in step S980.

Figure 17:
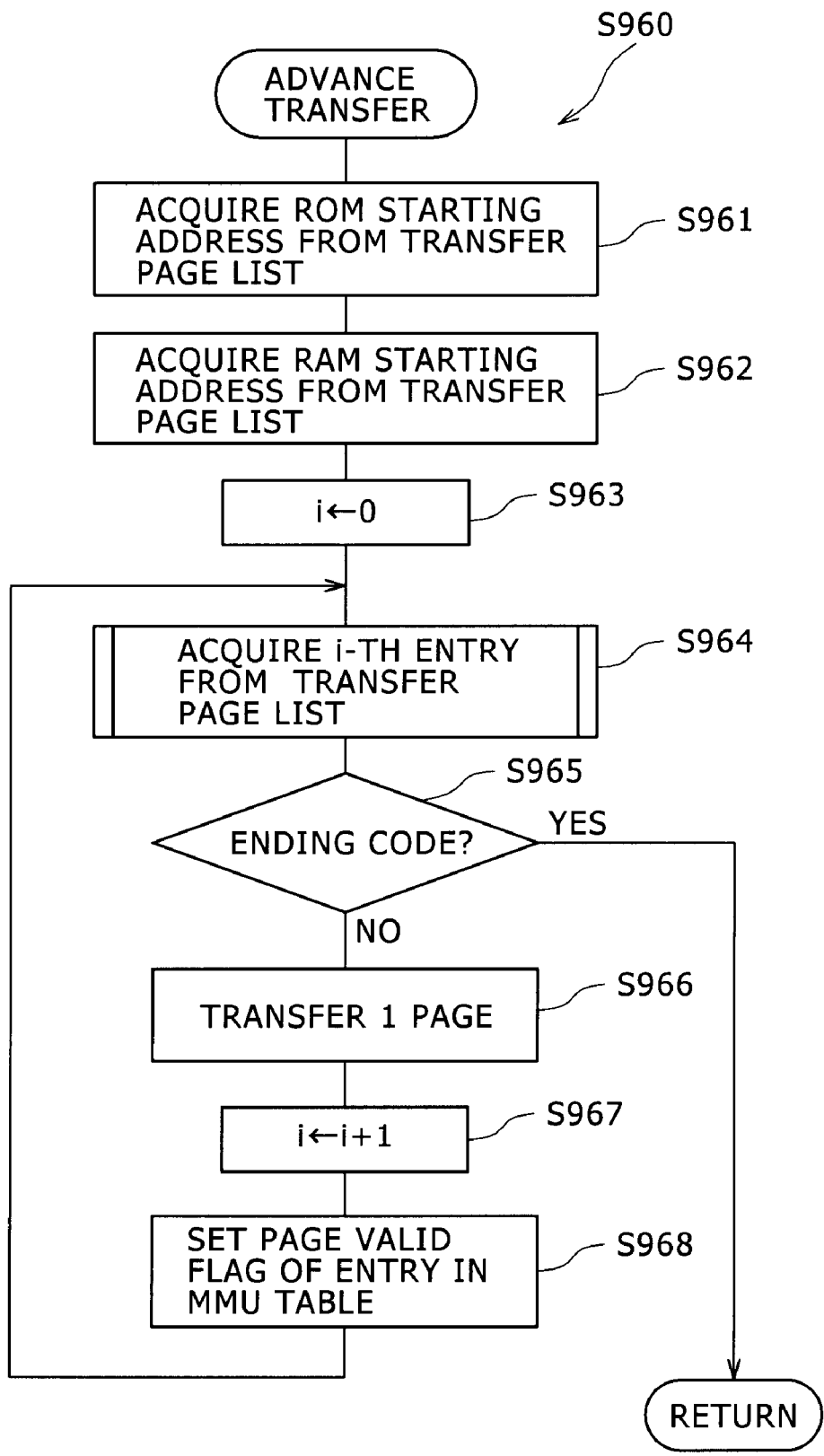
FIG. 17 is a flowchart of steps constituting a typical advance transfer procedure performed by the executing apparatus in a manner according to an embodiment the present invention.

FIG. 17 is a flowchart of steps constituting a typical advance transfer procedure (corresponding to step S960 in FIG. 16) performed by the executing apparatus 200 in a manner according to an embodiment of the present invention. The ROM starting address 5041 and RAM starting address 5042 are acquired in steps S961 and S962 respectively from the transfer page list 504. In step S963, a counter "i" is reset to "0."

In step S964, the page number of the i-th page to be transferred is acquired from the transfer page list 504. If the acquired page number points to the ending code, then the advance transfer is brought to an end in step S965. Otherwise the page in question is transferred in step S966. Suppose that the ROM starting address 5041 is represented by "rom_start," the RAM starting address 5042 by "ram_start," and the transfer object page number by "page_num" and that each page has a size of 4 KB. In that case, data of 4 KB is transferred from the location of "rom_start+(page_num)×4 KB" to the location of "ram_start+(page_num)×4 kb."

Following the one-page transfer, the counter "i" is incremented by "1" in step S967. In step S968, the page valid flag 730 of the corresponding entry in the MMU table 611 is set to be valid.

Figure 18:
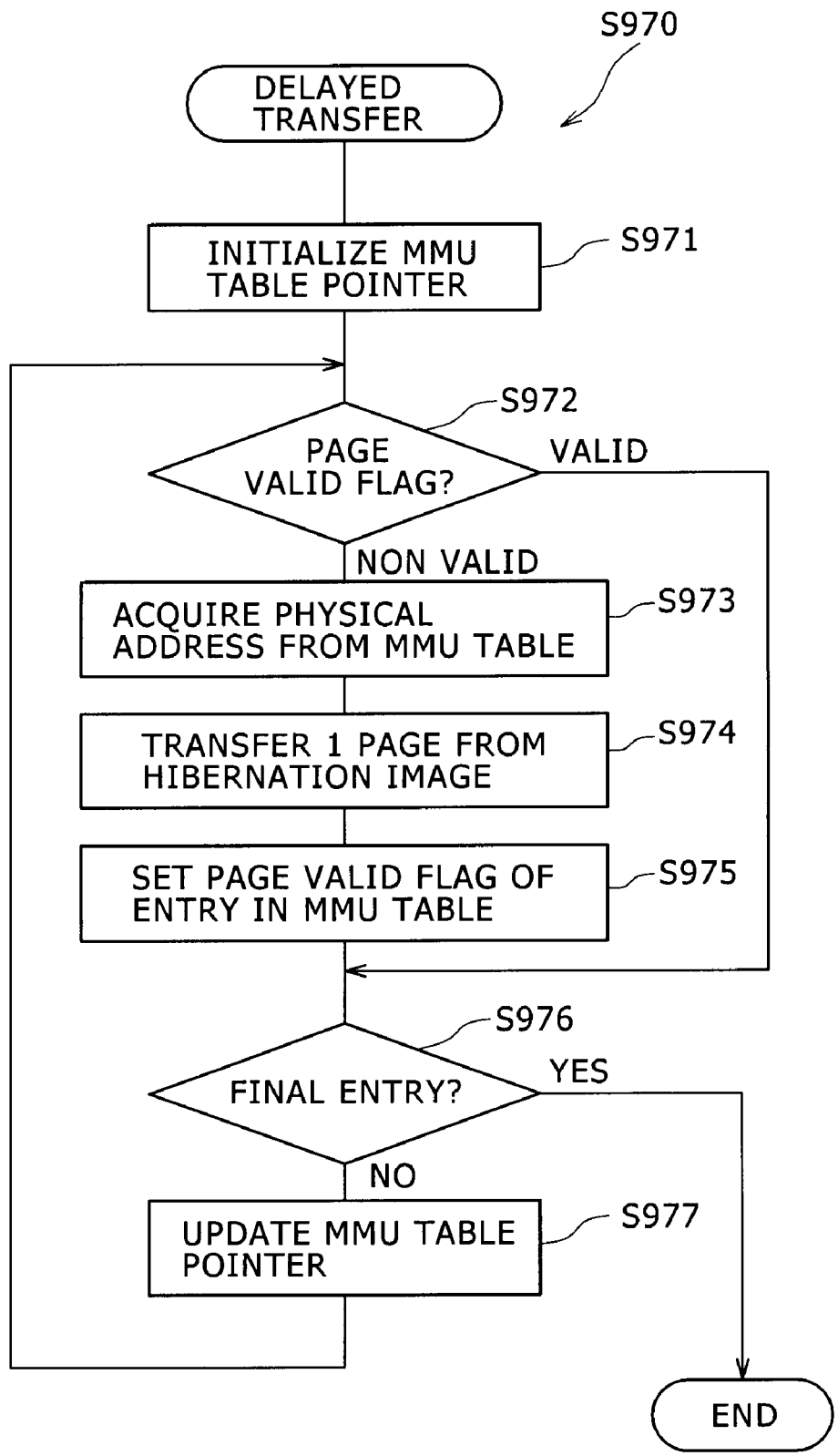
FIG. 18 is a flowchart of steps constituting a typical delayed transfer procedure performed by the executing apparatus in a manner according to an embodiment the present invention.

FIG. 18 is a flowchart of steps constituting a typical delayed transfer procedure (corresponding to step S970 in FIG. 16) performed by the executing apparatus 200 in a manner according to an embodiment of the present invention. In step S971, the search pointer of the MMU table 611 is initialized. In step S972, a search is made for the entry pointed to by the pointer in the MMU table 611, and a check is made to determine whether the page valid flag 730 of the detected entry is valid.

If in step S972 the page valid flag 730 is found to be invalid, the following process takes place: in step S973, the physical address of the detected entry is acquired. The physical address held at the RAM starting address 5042 in the transfer page list 504 is subtracted from the acquired physical address, whereby an offset of the transfer object page relative to the starting address is acquired. In like manner, an offset of the page in question of the hibernation image 502 in the ROM 220 is obtained. One page relative to the acquired offset is then transferred in step S974. In step S975, the page valid flag 730 of the corresponding entry in the MMU table 611 is set to be valid. Thereafter, step S972 and the subsequent steps are repeated.

If the pointer of the MMU table 611 points to the last entry in the MMU table 611, then the delayed transfer is brought to an end in step S976. Otherwise the pointer of the MMU table 611 is updated to point to the next entry in step S977.

Figure 19:
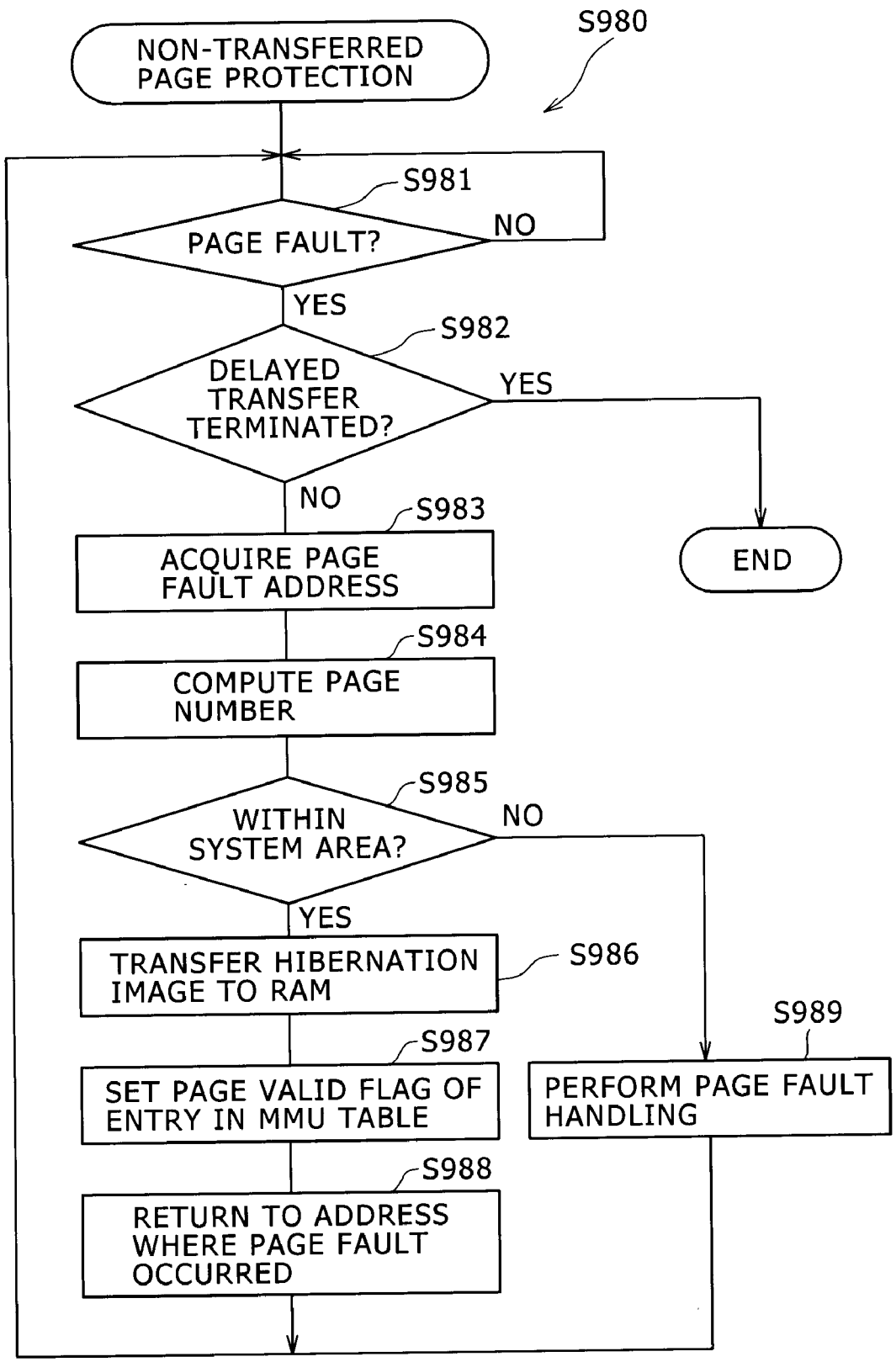
FIG. 19 is a flowchart of steps constituting a typical non-transferred page protection procedure performed by the executing apparatus in a manner according to an embodiment the present invention.

FIG. 19 is a flowchart of steps constituting a typical non-transferred page protection procedure (corresponding to step S980 in FIG. 16) performed by the executing apparatus 200 in a manner according to an embodiment of the present invention. If a page fault occurs in step S981 because the page valid flag 730 is found invalid, then a check is made in step S982 to determine whether the delayed transfer (corresponding to step S970 in FIG. 16) as a whole has ended. If the delayed transfer is found to have ended, then the non-transferred page protection procedure is terminated. If the delayed transfer is not found to be completed, the address at which the page fault occurred is acquired in step S983. In step S984, the page number of the page containing the acquired address is computed in step S984.

If the address at which the page fault occurred is found to be outside the system RAM 610 in step S985, then ordinary page fault handling is carried out in step S989. In the case of a built-in system, the system is usually terminated at this point.

If the address at which the page fault took place is found to be inside the system RAM 610 in step S985, then that page in the hibernation image 502 which corresponding to the page number (PAGE_NUM) containing the address at which the page fault occurred is transferred to the system RAM 610 in step S986. In step S987, the page entry flag 730 of that entry in the MMU table 611 which corresponds to the page number (PAGE_NUM) containing the page where the fault address occurred is set to be valid. In step S988, control is returned to the address at which the page fault was recognized.

According to the embodiments of the present invention described above, the advance transfer unit 201 of the executing apparatus 200 transfers part of the hibernation image 502 from the ROM 220 to the RAM 230 based on the transfer page list 504 created by the analyzing apparatus 100. After activation of the operating system, the delayed transfer unit 202 transfers the rest of the hibernation image 502. In this manner, the operating system can be activated without waiting for the transfer of the entire hibernation image 502 to be completed.

If a non-transferred page is accessed before the delayed transfer unit 202 executes delayed transfer of that page, the necessary page transfer unit 203 dynamically transfers the page in question to the RAM 230. This arrangement addresses the types of access not expected by the analyzing apparatus 100.

A typical application of the information-processing apparatus is a digital still camera. Immediately after power-up, the digital still camera is generally expected to need only 20 to 30 percent of its hibernation image in order to deal with the typically anticipated operations at the outset such as interface and shutter manipulations. This presumably makes it possible to start camera operations soon after part of the hibernation image has been transferred in advance.

With the above-described embodiments of the present invention, part of the hibernation image was shown to be transferred in advance by the advance transfer unit 201. Alternatively, the advance transfer process may be omitted where dynamic transfer is carried out by the necessary page transfer unit 203. This, however, presupposes that the memory areas (including exception vectors) for exception handling and the MMU table area are transferred beforehand from the ROM to the RAM. When the operating system is activated, a page fault occurs at the entry point of the operating system. Exception handling is then carried out in the RAM, and pages are transferred dynamically from the ROM to the RAM by the necessary page transfer unit 203. Since it takes some time for the necessary page transfer unit 203 to effect such transfer, it is generally advantageous in terms of performance to transfer beforehand those areas that are expected to be accessed immediately after activation.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow.

For example, as mentioned earlier, one embodiment of the present invention is an information-processing apparatus including a computer, an execution-state holding unit, an execution-state saving unit, a transfer-history holding unit, an access detection unit, and a necessary area transfer unit. With this structure, the computer may correspond illustratively to the processor 210, the execution-state holding unit to the RAM 230, the execution-state saving unit to the ROM 220, the transfer-history holding unit to the MMU table 611, the access detection unit to the access detection unit 209, and the necessary area transfer unit to the necessary page transfer unit 203.

One preferred embodiment of the present invention, as mentioned above, is the information-processing apparatus further including an advance transfer unit. With this structure, the advance transfer unit may correspond illustratively to the advance transfer unit 201.

Another preferred embodiment of the present invention is the information-processing apparatus further including a delayed transfer unit. With this structure, the delayed transfer unit may correspond illustratively to the delayed transfer unit 202.

A further preferred embodiment of the present invention, as explained above, is the information-processing apparatus further including a computer, a second access detection unit, and an advance transfer object holding unit. With this structure, the computer may correspond illustratively to the processor 110, the second access detection unit to the access monitoring unit 108, and the advance transfer object holding unit to the transfer page list 504.

Another embodiment of the present invention, as mentioned above, is a method for activating an information-processing apparatus including a computer, an execution-state holding unit, an execution-state saving unit, and a transfer-history holding unit. The computer may correspond illustratively to the processor 210, the execution-state holding unit to the RAM 230, the execution-state saving unit to the ROM 220, and the transfer-history holding unit to the MMU table 611. The inventive method includes the steps of detecting access to memory and transferring a necessary area from one memory to another. The access detecting step may correspond illustratively to step S981 and the necessary area transferring step to step S985.

The steps and procedures discussed above in conjunction with the embodiments of the present invention may be regarded as constituting the method including such steps and procedures. Alternatively, these steps and procedures may be regarded as constituting a program that causes a computer to execute the described processes, or as a recording medium that accommodates that program.

It should be understood by those skilled in the art that various modifications, combinations, sub-combinations and alterations may occur depending on design requirements and other factors insofar as they are within the scope of the appended claims or the equivalents thereof.

What is claimed is:

1. An information-processing apparatus, comprising:
a processor;
an execution-state saving unit configured to store an execution state of a program upon suspension of the program at a predetermined execution point of said program, the program associated with a plurality of pages;
an execution-state holding unit configured to store a predetermined set of pages from the plurality of pages associated with the program, the program being resumed from suspension upon transfer of the predetermined set of pages from the execution-state saving unit to the execution-state holding unit, the predetermined set of pages determined according to an access history indicating a number of times each page included in the plurality of pages is accessed prior to suspension of the program;
a page table unit configured to indicate whether a transfer status of a transfer page from the plurality of pages is valid, the transfer status set to valid upon transfer of the transfer page from the execution-state saving unit to the execution-state holding unit, the transfer page not included in the predetermined set of pages from the plurality of pages associated with the program;
an access detection unit configured to detect whether said processor has accessed the transfer page and set the transfer status to valid upon transfer of the transfer page from the execution-state saving unit to the execution-state holding unit; and
a necessary area transfer unit configured to transfer the transfer page from said execution-state saving unit to said execution-state holding unit upon access of said transfer page and determination that the transfer status is not valid.

2. The information-processing apparatus according to claim 1, wherein said execution state stored in said execution-state holding unit includes a memory image managed by an operating system.

3. The information-processing apparatus according to claim 1, wherein said execution-state saving unit includes a nonvolatile memory.

4. The information-processing apparatus according to claim 1, wherein the transfer page is a page representing one of segments making up an area stored by said execution-state holding unit, said segments having a fixed size each.

5. The information-processing apparatus according to claim 1, further comprising:
an advance transfer unit configured to transfer the predetermined set of pages associated with the program from said execution-state saving unit to said execution-state holding unit upon activation of said information-processing apparatus;
wherein the page table unit indicates that the one or more pages associated with the predetermined program are transferred from said execution-state saving unit to said execution-state holing unit by said advance transfer unit.

6. The information-processing apparatus according to claim 5, further comprising:
a delayed transfer unit configured to transfer from said execution-state saving unit to said execution-holding unit one or more pages from said plurality of pages not included in the predetermined set of pages and not previously transferred by said advance transfer unit upon activation of said information-processing apparatus.

7. The information-processing apparatus according to claim 5, further comprising:
a second access detection unit configured to detect whether said computer processor has accessed said execution state stored in said execution-state holding unit prior to the execution of said program at said predetermined execution point; and
an advance transfer object holding unit configured to store a history of how said second access detection unit has detected the access of said processor, as an object to be transferred by said advance transfer unit.

8. A method for activating an information-processing apparatus, said method comprising:
storing, in an execution-state saving unit of said information-processing apparatus, an execution state of a program upon suspension of a program a predetermined execution point of said program, the program associated with a plurality of pages;
storing, in an execution-state holding unit of said information-processing apparatus, a predetermined set of pages from the plurality of pages associated with the program, the program being resumed from suspension upon transfer of the predetermined set of pages from the execution-state saving unit to the execution-state holding unit, the predetermined set of pages determined according to an access history indicating a number of times each page included in the plurality of pages is accessed prior to suspension of the program;
indicating, in a page table unit, whether a transfer status of a transfer page from the plurality of pages is valid, the transfer status set to valid upon transfer of the transfer page from the execution-state saving unit to the execution-state holding unit, the transfer page not included in the predetermined set of pages from the plurality of pages associated with the program;
detecting whether said information-processing apparatus has accessed the transfer page;
setting the transfer status to valid upon transfer of the transfer page from the execution-state saving unit to the execution-state holding unit; and
transferring the transfer page from said execution-state saving unit to said execution-state holding unit upon access of said transfer page and determination that the transfer status is not valid.

9. A non-transitory computer readable storage medium encoded with a computer readable program configured to cause an information-processing apparatus to execute a method comprising:
storing, in an execution-state saving unit of said information-processing apparatus, an execution state of a program upon suspension of the program at a predetermined execution point of said program, the program associated with a plurality of pages;
storing, in an execution-state holding unit of said information-processing apparatus, a predetermined set of pages from the plurality of pages associated with the program, the program being resumed from suspension upon transfer of the predetermined set of pages from the execution-state saving unit to the execution-state holding unit, the predetermined set of pages determined according to an access history indicating a number of times each page included in the plurality of pages is accessed prior to suspension of the program;
indicating, in a page table unit, whether a transfer status of a transfer page from the plurality of pages is valid, the transfer status set to valid upon transfer of the transfer page from the execution-state saving unit to the execution-state holding unit, the transfer page not included in the predetermined set of pages from the plurality of pages associated with the program;
detecting whether said information-processing apparatus has accessed the transfer page;
setting the transfer status to valid upon transfer of the transfer page from the execution-state saving unit to the execution-state holding unit; and
transferring the transfer page from said execution-state saving unit to said execution-state holding unit upon access of said transfer page and determination that the transfer status is not valid.

* * * * *